US012640330B2

(12) United States Patent
Edler et al.

(10) Patent No.: US 12,640,330 B2
(45) Date of Patent: May 26, 2026

(54) RADIATION WINDOW, ENCAPSULATION AND METHOD FOR PRODUCING AN ENCAPSULATION

(71) Applicant: KETEK GmbH Halbleiter—und Reinraumtechnik, Munich (DE)

(72) Inventors: Simon Edler, Munich (DE); Michael Darius Fraczek, Pliening (DE); Lothar Höllt, Bad Heilbrunn (DE); Florian Dams, Regenstauf (DE); Andreas Pahlke, Brunnthal (DE); Florian Herdl, Oberaudorf (DE)

(73) Assignee: KETEK GmbH Halbleiter- und Reinraumtechnik, Munich (DE)

( * ) Notice: Subject to any disclaimer, the term of this patent is extended or adjusted under 35 U.S.C. 154(b) by 115 days.

(21) Appl. No.: 18/545,086

(22) Filed: Dec. 19, 2023

(65) Prior Publication Data

US 2025/0201507 A1      Jun. 19, 2025

(51) Int. Cl.
H01J 35/18          (2006.01)
G01T 1/24           (2006.01)

(52) U.S. Cl.
CPC .............. H01J 35/18 (2013.01); G01T 1/244 (2013.01); H01J 2235/183 (2013.01)

(58) Field of Classification Search
CPC ...... H01J 35/18; H01J 2235/183; G01T 1/244
See application file for complete search history.

(56) References Cited

U.S. PATENT DOCUMENTS

| | | | |
|---|---|---|---|
| 5,226,067 A | 7/1993 | Allred et al. | |
| 5,740,228 A | 4/1998 | Schmidt et al. | |
| 8,498,381 B2 * | 7/2013 | Liddiard | H01J 5/18 |
| | | | 378/161 |
| 8,698,091 B2 * | 4/2014 | Decker | H10D 8/50 |
| | | | 250/336.1 |
| 9,976,211 B2 | 5/2018 | Firouzdor et al. | |
| 10,755,900 B2 | 8/2020 | Tran et al. | |
| 11,094,494 B2 | 8/2021 | Alivov et al. | |
| 2013/0051535 A1 * | 2/2013 | Davis | H01J 5/18 |
| | | | 264/400 |
| 2013/0094629 A1 | 4/2013 | Liddiard et al. | |
| 2014/0044240 A1 * | 2/2014 | Pahlke | H01J 5/18 |
| | | | 378/161 |
| 2015/0016593 A1 * | 1/2015 | Larson | H01J 5/18 |
| | | | 378/161 |
| 2018/0221830 A1 * | 8/2018 | Larson | H01J 5/18 |
| 2023/0134647 A1 | 5/2023 | Murakami et al. | |
| 2023/0266488 A1 * | 8/2023 | Wiest | H01J 5/18 |
| | | | 250/336.1 |
| 2025/0199189 A1 * | 6/2025 | Fraczek | G02B 27/30 |

FOREIGN PATENT DOCUMENTS

EP          4131319 A1      2/2023

* cited by examiner

*Primary Examiner* — Casey Bryant
(74) *Attorney, Agent, or Firm* — Slater Matsil, LLP

(57)          ABSTRACT

In an embodiment a radiation window for a radiation detector or a radiation source includes a window element and a first protection film, wherein the first protection film at least partially covers a first main surface of the window element facing away from the detector or the radiation source, wherein the first protection film increases a robustness of the window element, wherein the window element is configured to sustain a pressure difference of at least 1 atm, and wherein a ratio between a Young's modulus and an indentation modulus of the window element is between 0.5 and 2.

19 Claims, 14 Drawing Sheets

FIG 27A
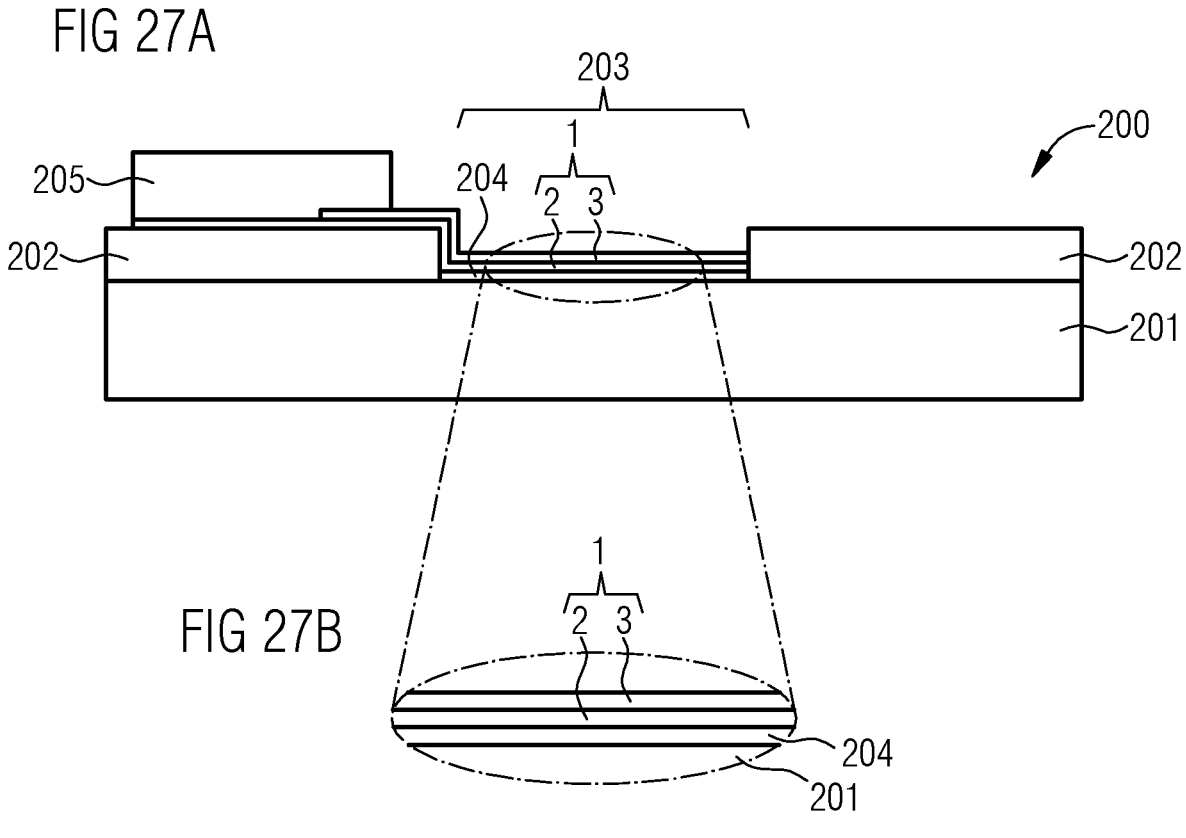
FIG 27B
FIG 28
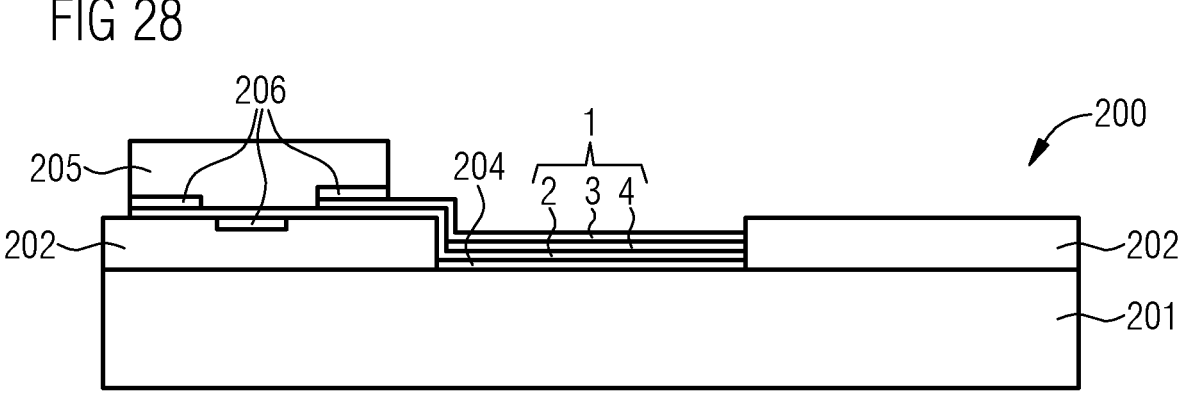

RADIATION WINDOW, ENCAPSULATION AND METHOD FOR PRODUCING AN ENCAPSULATION

TECHNICAL FIELD

A radiation window is specified. Furthermore, an encapsulation and a method for producing an encapsulation is specified.

SUMMARY

Embodiments provide an improved radiation window that is in particular robust. Further embodiments provide an encapsulation, for example for a radiation detector or a radiation source, comprising such a radiation window and a method for producing such a radiation window.

According to at least one embodiment of the radiation window, the radiation window is configured to be used as a radiation window for a radiation detector or a radiation source. For example, the radiation detector is an X-ray detector such as a solid state detector. Examples for a solid state detector are semiconductor detectors such as silicon drift detectors or so-called PIN-diodes, and also Shottky-diodes. Alternatively, the detector may be an optical detector or a detector configured to detect cathode rays. The radiation source is, for example, a radiation source for X-rays such as an X-ray tube or a radiation source for cathode rays such as a large cathode-ray tube or an electron source like an electron gun or the like.

According to at least one embodiment, the radiation window comprises a window element and a protection film. The protection film at least partially covers a first main surface of the window element facing away from the radiation detector or the radiation source. Preferably, the protection film is an additional layer applied to the main surface. Alternatively, it is possible that the protection film is part of the window element or that the protection film and the window element are formed in one piece. In the latter case, the window element and the protection film may comprise hexagonal boron nitride.

According to at least one embodiment of the radiation window, the window element is configured to sustain a pressure difference of at least 1 atm or at least 1.5 atm. The pressure difference is, for example, between a region in the vicinity of the first main surface of the window element and a region in the vicinity of a second main surface of the window element. The second main surface is in particular opposite to the first main surface.

For example, the radiation window is configured to be used in/for a hermetically sealed encapsulation in which the radiation detector and/or the radiation source is arranged. In this case, the region in the vicinity of the first main surface of the window element may be the natural environment or a laboratory environment and the region in the vicinity of the second main surface of the window element may be the inside of the encapsulation.

In another possible application the radiation window is configured to be part of the radiation source itself. For example, particle radiation (e.g. electron radiation) can be converted into photon radiation inside the radiation window or inside an optional target material on a side of the radiation window facing the electron source, i.e., the second main surface. Alternatively, the window may have also other operational functionality apart from being transmissive for the radiation of interest, for example by forming an electric potential field necessary to operate the radiation source.

Preferably, a vacuum is present inside the encapsulation. A vacuum is understood here and in the following as a pressure below $10^{-1}$ mbar, preferably below $10^{-3}$ mbar or $10^{-5}$ mbar or $10^{-9}$ mbar. For example, the vacuum complies with the German industry norm DIN28400. Alternatively, the inside of the encapsulation may be filled with a gas. For example, the gas inside the encapsulation may be xenon and nitrogen. In this case, a pressure inside the encapsulation is below 300 mbar or below 50 mbar or preferably below 30 mbar or further preferably below 10 mbar. Preferably the gas has a low heat conductance. At the same time, the environmental pressure outside the encapsulation is approximately at atmospheric pressure, lower or higher. The environmental pressure is, for example, between $10^{-9}$ mbar and 1.5 atm inclusive. However, it is possible that in certain applications the pressure inside the encapsulation may be the same, approximately the same or even greater than the environmental pressure, for example when the radiation detector and/or the radiation source is operated inside an evacuated chamber. Such low pressures outside the encapsulation may occur, for example, during operation in a scanning electron microscope (SEM). In particular during carrying out a measurement or generating radiation the pressure inside the encapsulation is preferably a vacuum. Furthermore, the environment outside the encapsulation can also be a fluid, a plasma, certain ions, and/or radicals.

According to at least one embodiment of the radiation window, the protection film is configured to increase a robustness of the window element. That is, the protection film is formed plasma-stable, oxygen stable, chemically resistant and/or corrosion resistant, e.g. resistant to radicals and/or ions and/or UV radiation. In particular, radiation that is to be detected and/or generated by the radiation detector or the radiation source, respectively, comprises high energy. This high energetic radiation may cause free ions, radicals, metastable molecules (for example ozone) and/or UV radiation in the vicinity of the radiation window, for example due to ionizing ambient molecules, atoms or particles that are, for example, part of the atmosphere or generated by another device or mechanism in the ambient vicinity. These free ions and/or free radicals may generate a degeneration from which the window element is preferably protected. For example, the protection film is configured to be robust against chemical reactions, interactions with radicals, ions, metastable or reactively active molecules and atoms such as ozone or water molecules. Furthermore, the protection film is preferably configured to be robust against interactions with UV-radiation.

Apart from such a degeneration, the protection film may additionally protect the window element against other environmental influences such as moisture. This means in particular that a lifetime of the window element can be increased by means of the protection film. Furthermore, the window element may be protected against physical erosion. Such physical erosion may occur if ions or neutral particles are accelerated on a surface of the window element, for example the first or second main surface.

According to at least one embodiment of the radiation window, a ratio between a Young's modulus and an indentation modulus of the window element is between 0.5 and 2. For example, the Young's modulus of the window element is, for example, at least 70 GPa or at least 90 GPa or at least 110 GPa or at least 120 GPa or at least 140 GPa. Additionally or alternatively, the Young's modulus of the window element is, for example, at most 180 GPa or at most 160 GPa or at most 150 GPa. With such a Young's modulus, the window element comprises an elasticity that is sufficient that the window element, in particular together with the protection film, sustains a pressure difference of at least 1 atm.

For example, the indentation modulus of the window element is, for example, at least 70 GPa or at least 90 GPa or at least 110 GPa or at least 125 GPa. Additionally or alternatively, the indentation modulus of the window element is, for example, at most 190 GPa or at most 180 GPa or at most 150 GPa.

Additionally or alternatively a Vickers hardness of the window element is between 550 N/mm² and 1400 N/mm², for example between 560 N/mm² and 1290 N/mm², inclusive. For example, the Vickers hardness is at least 600 N/mm² or at least 625 N/mm² or at least 1000 N/mm² and/or at most 1400 N/mm². With such an indentation modulus and/or such a Vickers hardness, the window element has a brittleness that is low enough that the window element, in particular together with the protection film, sustains a pressure difference of at least 1 atm.

It has been surprisingly shown that by a non-trivial adjustment of the ratio between the Young's modulus and the indentation modulus of the window element to be between 0.5 and 2, the window element may advantageously comprise sufficient elasticity and, at the same time, a low enough brittleness such that the window element may sustain the pressure difference of at least 1 atm and may have an increased lifetime.

In at least one embodiment the radiation window for a radiation detector or a radiation source comprises a window element and a protection film. The protection film at least partially covers a first main surface of the window element facing away from the detector or the radiation source. The window element is configured to sustain a maximum pressure difference of at least 1 atm. The protection film preferably is configured to increase a robustness of the window element. A ratio between a Young's modulus and an indentation modulus of the window element is between 0.5 and 2.

The radiation window described herein is based on the following technical considerations. For an X-ray detection of elements with spectral lines of low energy, radiation corresponding to these spectral lines has to be transferred through a radiation window. A detection of such elements, for example elements with a low atomic number, is to be carried out in a vacuum, if possible. A reason for this is that low energy X-ray photons are usually absorbed in the atmosphere. Furthermore, for an application, encapsulation of the detector in a vacuum is needed in order to protect the detector from luminescence, ambient light, condensation or environmental influences or other influences.

In the case that the radiation window is used for a radiation source, for example, an electron source is sealed by the radiation window. In this case both low energetic X-rays and low energetic electrons may be transmitted through the radiation window. The terms "low energetic" or "low energy" mean here and in the following, for example, an energy below 5 keV. These electrons and/or radiation may generate free ions or free radicals or other comparable negative influences in the outside environment such as the atmosphere or a surrounding liquid which may harm or destroy the window element over time. In particular, in case that the radiation window is used for a radiation source that is a solid state source or for a radiation detector without an encapsulation, the term "low energy" may also refer to energies below 50 eV.

The radiation window described herein makes use of the idea of applying a protection film on the window element. The window element may be protected against environmental influences, (physical and chemical) erosion, and free ions and/or radicals by the protection film. Thereby, the radiation window is designed such that its mechanical, electrical and/or optical properties are suitable for an application where the radiation window is used to seal a radiation detector and/or a radiation source.

In particular, the radiation window and/or the window element may comprise at least one of the following properties, alone or in combination:

A layer tension of the window element is between 80 MPa and 280 MPa.

A specific electrical resistance is between 0.8 mΩ cm and 1.1 mΩ cm. These values especially apply if the window element comprises carbon, pyrolytic graphite and/or graphene. This allows electrical charges that may accumulate at the radiation window to be efficiently dissipated.

A thickness of a window element comprising carbon is, for example, between 500 nm and 2 mm, between 50 nm and 250 nm or between one monolayer (approximately 0.3 nm) and 20 nm. In particular, the thickness of the window element is at most 2 mm or at most 100 µm or at most 5 µm in this case.

The window element, especially if the window element comprises carbon or graphene, shows a leakage rate, for example a He leakage rate, below $3 \times 10^{-9}$ mbar l/s. That is, the window element is not porous. Consequently, the radiation window is not porous.

The radiation window is configured to filter certain wavelengths. For example, the protection film may be formed as a wavelength filter. In particular, certain wavelength ranges may be blocked by the radiation window while other wavelength ranges are transmitted through the radiation window. For example, radiation in an ultraviolet, visible or infrared spectral range of the electromagnetic spectrum may be blocked while soft X-rays may be transmitted through the radiation window. If, for example, the radiation window is used in combination with a radiation detector, this may eliminate undesired perturbing radiation such as ultraviolet radiation or visible light, which may decrease the accuracy or performance of the detector.

The radiation window and/or the window element may comprise a round or elliptical or rectangular or quadratic shape or a polygonal shape in view of the first main surface. A maximal lateral extension, for example a diameter or an edge length, of the radiation window and/or the window element is, for example, at least 100 µm or at least 1 mm and at most 10 cm. For example, a ratio between a mean diameter of the radiation window element or the window element and a thickness of the radiation window or the window element is at least 10 or at last 100 or at least $10^4$ or at least $10^5$ or at least $10^6$. Alternatively or additionally, said ratio is at most $10^7$ or is at most $10^6$ or is at most $10^4$. Hence, the carbon layer can be comparably thin, relative to its lateral extent. These values especially apply if the radiation window is free of any further specific mechanical support structure.

Applications for a radiation window described here are, for example, X-ray topography, energy dispersive X-ray fluorescence analysis and spectroscopy, X-ray diffraction analysis, computed tomography scan, radiography, X-ray imaging, medical applications. Further applications may be, for example, a so-called X-ray gun, wavelength-disperse X-ray spectroscopy (abbreviated WDS), X-ray absorption spectroscopy (abbreviated XAS), total reflection X-ray fluorescence spectroscopy (abbreviated TXRF-spectroscopy).

Also, applications for detecting electrons inside for example a scanning electron microscope are thinkable. Furthermore, the radiation window may be used in applications involving an electron capture detector, an ion mobility spectrometer, an electrochemical cell, and general chemical reactors utilizing the generated rays, i.e. electrons or photons. Further applications may include a so-called u-reactor, an X-ray tube comprising a graphite anode or pyrolytic carbon and a so-called gate-insulator-substrate detector (GIS-detector).

According to at least one embodiment the window element may be provided with an electrical potential. In particular, the electrical potential may be used for operation of the radiation detector or the radiation source. In this case, the radiation detector or the radiation source is preferably a solid state radiation detector or a solid state radiation source. Furthermore, the window element in this case may be formed with an oxide layer or another suitable layer, in particular another insulating layer, and an electrically conductive layer serving as a gate electrode. Such a radiation detector or radiation source are also known as so-called GIS (gate-insulator-substrate) detector or source, respectively.

In particular, such a GIS electron source comprises a barrier layer, in particular a tunnel barrier layer directly arranged on a silicon substrate. On a side of the barrier layer facing away from the silicon substrate, the window element may be directly arranged. During operation, a voltage is applied between the silicon substrate and the window element. Due to this voltage electrons may tunnel through the barrier layer and may be emitted through the radiation window. Preferably, no hermetically sealed volume is necessary for a GIS electron source.

According to at least one embodiment of the radiation window, a further protection film at least partially covers the second main surface of the window element. Preferably, the further protection film is configured to be robust, in particular as mentioned above. In particular, the further protection film essentially comprises the same features as the protection film, for example with respect to material composition, thickness and the like. That is in particular, all features disclosed for the protection film are also disclosed for the further protection film and vice versa.

It is possible that the protection film and the further protection film are connected. In this case it may be possible that the protection film and the further protection film are one piece. For example, the protection film and the further protection film are produced in a common process. This means in particular that the protection film and the further protection film are produced using the same process and/or in a single process step at the same time.

If, for example, the radiation window is used for encapsulation of a radiation source and/or a radiation detector, and wherein a vacuum is sustained by the radiation window, residual gas may be present inside of the radiation source and/or radiation detector. During operation of the radiation source and/or radiation detector this residual gas may be ionized by radiation that is emitted or detected by the radiation source or the radiation detector, respectively. In order to protect the window element or the radiation window from this residual gas and/or ions of free radicals emerging from the residual gas, the further protection film is advantageously arranged on the second main surface. The second main surface in particular faces the radiation source and/or the radiation detector.

Additionally or alternatively, it is possible that condensable and/or non-condensable volatile organic compounds (VOC) may be present inside the encapsulation. Such VOC may emerge from gluing points inside of the encapsulation or from the encapsulation itself. These VOC may be fragmented, ionized or form radicals and harm the radiation window, respectively the window element, by radiation to be detected by the radiation detector or emitted by the radiation source. The window element may be efficiently protected against VOCs and their fragment products by the further protection film.

According to at least one embodiment of the radiation window, the window element together with the protection film is configured to transmit at least 0.1% % of radiation with an energy of 50 eV and/or at least 30% of radiation with an energy of 270 eV. This in particular allows that also low energy X-ray photons can be detected by the radiation detector. For example, a K-alpha line of lithium having an energy of 54.3 eV or a K-alpha line of carbon having an energy of 277 eV may be detected when using the radiation window described herein.

In particular, the transmissivity of the radiation window increases with increasing energy of the radiation to be detected by the radiation detector and/or to be emitted by the radiation source. That is, a transmissivity of 0.1% % at 50 eV and/or at least 30% of radiation with an energy of 270 eV may be regarded as a lower limit of the transmissivity of the radiation window.

According to at least one embodiment of the radiation window, the window element comprises a thickness between 50 nm and 250 nm. Additionally or alternatively, the protection film comprises a thickness between one monolayer (approximately 0.3 nm) and 100 nm or between 50 nm and 100 nm. Here and in the following, a thickness of one monolayer in particular refers to a thickness of a diameter of the respective atoms or molecules forming the monolayer. Here and in the following a monolayer comprises a thickness of approximately 0.3 nm.

In this embodiment, the window element is preferably a membrane, in particular a thin membrane. A radiation window comprising a window element, which is a membrane, is particularly suitable for a radiation detector. A reason for this is, in particular, that a thin radiation window may comprise a particularly large transmissivity.

According to at least one embodiment of the radiation window, the window element comprises a thickness between 500 nm and 3 μm or between 500 nm and 10 μm or between 500 nm and 2 mm. For example, the window element comprises a thickness of at least 500 nm and/or at most 2 mm or at most 100 μm or at most 5 μm or at most 2 μm. Additionally or alternatively, the protection film comprises a thickness between one monolayer and 100 nm or between 50 nm and 100 nm. In this embodiment, the window element is preferably a membrane, in particular a thick membrane. A radiation window comprising a window element, which is a membrane, is particularly suitable for a radiation detector. A reason for this is, in particular, that a thin radiation window may comprise a particularly large transmissivity. Furthermore, such a thick radiation window is particularly suitable for a radiation source, for example, an X-ray tube. In this case, the radiation window may comprise a thickness of at most 10 μm or at most 100 μm or at most 2 mm. Advantageously, with such a thick radiation window, heat that is generated at the radiation window during operation of the radiation source may be efficiently dissipated.

According to at least one embodiment of the radiation window, the window element is formed with an atomic monolayer. That is in particular, the thickness of the window element may be at least a diameter of the respective atoms forming the mono layer. Additionally or alternatively, the window element comprises a thickness of at least 0.3 nm and/or at most 20 nm.

Additionally or alternatively, the protection film comprises a thickness between one atomic monolayer and 5 nm. For example, the protection film comprises a thickness between 0.3 nm and 5 nm. In this present embodiment, the radiation detector or the radiation source is a GIS detector or source respectively. That is, the window element is provided with an electrical potential during operation as described above.

According to at least one embodiment of the radiation window, a bonding agent layer is arranged between the window element and the protection film. In the case that the radiation window comprises a further protection film, a bonding agent layer may also be arranged between the window element and the further protection film. Preferably, the bonding agent layer is in direct contact with the window element and the protection film.

For example, the bonding agent layer is an additional layer between the window element and protection film which is configured to increase adhesion between the window element and the protection film. The bonding agent layer may comprise a plurality of sublayers.

Additionally or alternatively, the bonding agent layer is part of the window element. In this case, for example, the bonding agent layer is directly arranged at the first main surface. In particular, the first main surface is formed by the bonding agent layer. The bonding agent layer may emerge from a surface preparation of the first main surface, by which an adhesion between the window element and the protection film may be increased. For example, the first main surface is roughened or chemically treated or physically treated or cleaned.

Furthermore, a further bonding agent layer may be arranged between the window element and the further protection film. In particular, the further bonding agent may comprise the same features, materials and functionality as the bonding agent layer. That is, the features disclosed for the bonding agent layer are also correspondingly disclosed for the further bonding agent layer and vice versa.

It is also possible that, additionally or alternatively to the bonding agent layer, one or more intermediate layers may be arranged between the window element and the protection film. By these intermediate layers mechanical and/or optical properties of the radiation window may be adapted for application.

According to at least one embodiment, the radiation window further comprises a frame mechanically carrying the window element together with the protection film. For example, the frame is formed with silicon or another semiconductor material. In this embodiment, the window element may in particular be a membrane.

Additionally or alternatively, the frame may comprise or may be manufactured from a Si-Wafer such as a prime wafer, a monitor wafer, a test wafer, a so-called CZ-wafer that is produced by a Czochralski process, a so-called FZ-wafer that is produced by a Floating zone crystal growth process, of any suitable diameter. The wafer may be polished, cut, etched and/or grinded on one or both sides. The wafer may have one of the following crystal orientations: <100>, <111>, <110>. Furthermore, the frame may comprise or may be manufactured from a so-called SOI wafer, which is the abbreviation for "silicon on insulator". Such an SOI wafer may be formed by fusion bonding. It is also possible that the frame comprises or is formed from a glass wafer, for example comprising fused quartz, fused silica or borofloat, a sapphire wafer, a silicon on sapphire wafer, GaAs, Ge and/or InAs.

According to at least one embodiment of the radiation window, the protection film extends to the frame and at least partially covers the frame in view of the first main surface. For example, during production of the radiation window, the protection film is applied after fabrication of the window element and the frame. In particular, the window element and the frame are fabricated by deposing the window element on a substrate, which is subsequently etched to form the frame. By arranging the protection film additionally on the frame, the frame may be protected against environmental influences and other influences, for example as described above, from free ions, free radicals, reactive molecules and/or other reactive gas in the atmosphere in the vicinity of the first main surface.

According to at least one embodiment of the radiation window, the protection film completely surrounds the window element together with the frame on all sides. By completely surrounding the window element and the frame with the protection film, both the window element and the frame may be efficiently protected against environmental influences and/or a plasma comprising free ions, of free radicals, reactive molecules and/or reactive gas on all sides.

According to at least one embodiment, the radiation window comprises a contact metal, which is arranged on the side of the protection film facing away from the window element. The contact metal is in particular configured to establish a mechanical contact to an encapsulation of the radiation detector and/or radiation source. For example, the contact metal is configured to be a soldering point. The contact metal comprises, for example, gold. The contact metal can be formed with one metal layer. Alternatively, the contact metal may be formed with a plurality of stacked layers, wherein each of the layers may comprise different materials, in particular different metals.

In particular, the contact metal is directly arranged on the protection film. Additionally or alternatively, an intermediate layer is arranged between the protection film and the contact metal. By such an intermediate layer, good adhesion may be established between the contact metal and the protection film.

In an alternative embodiment, the contact metal is in direct contact to the window element. In such a case, the contact metal is arranged beside the protection film on the first main surface. Preferably, the first main surface is completely covered by the protection film together with the contact metal in view of the first main surface.

Additionally or alternatively, the contact metal is in direct contact to the frame. In such a case, the contact metal is preferably arranged beside the protection film and the window element. In this embodiment, the window element is in particular a membrane.

According to at least one embodiment of the radiation window, the radiation window comprises a support structure configured to mechanically support the window element. In this embodiment, the window element is in particular a membrane. The support structure comprises, for example, silicon or another semiconductor material. It is possible that the support structure and the frame are formed with the same material. In particular, the support structure is arranged at the second main surface of the window element. The support structure may also comprise, for example the window material or may be completely made of the window material or of the further protection layer material.

In particular, a distance between two adjacent elements of the support structure is, below 2 mm. For example, the distance between two adjacent elements of the support structure is at least 0.2 mm and at most 1.9 mm. In view of the first main surface, a space between elements of the support structure comprises, for example, the shape of a parallelogram.

By using the support structure, the window element, and hence the radiation window, may be formed particularly thin and at the same time with a sufficient mechanical stability. As a result, a maximum lateral extent of the radiation window may be increased.

According to at least one embodiment of the radiation window, the support structure is at least partially covered by the protection film or the further protection film. The support structure may be in direct contact with the window element. Preferably, all outer surfaces of the support structure are each covered by the window element or the protection film or the further protection film. However, it is also possible that only side surfaces of the support structure or parts of the side surfaces, extending orthogonal to the second main surface, are covered by the protection film or the further protection film.

The support structure may be protected against environmental influences and/or a plasma comprising free ions, free radicals, reactive molecules and/or another reactive gas by the protection film or further protection film.

According to at least one embodiment of the radiation window, the window element and/or the protective film is configured to focus at least a part of a radiation passing the radiation window. For example, the radiation window may be formed as a focusing lens. If, for example, the radiation window is used in combination with a radiation detector, radiation to be detected by the detector may be focused by the radiation window. In this case, the detector may comprise a smaller lateral dimension.

In particular, the window element and/or the protection film may comprise a thickness gradient, a multilayer structure, a microstructure on an outer surface structure such as a diffractive grating, and/or a topology variation in order to achieve a focus at least part of the radiation passing the window element. For example, a refractive index of the radiation window and/or the protection film is varied along a lateral dimension such that at least a partial focusing of the radiation passing the radiation window can be achieved. Or, for example, the radiation window and/or the protective film form a refractive lamellar structure so that at least a partial focusing of the radiation passing the radiation window can be achieved.

According to at least one embodiment of the radiation window, a criterion sum is defined as a sum of a product of a thickness of the window element and the mass number of a material of the window element as a first summand and a product of a thickness of the protection film the mass number of the protection film as a second summand. If, for example, the window element comprises at least one further layer, the sum is extended by further summands, wherein each summand is given by a product of a thickness of the further layer and the mass number of the further layer.

For example, the criterion sum is at most 6 $\mu m \times g/mol$, in particular in case that the window element is a thin membrane as discussed above. For example, the criterion sum with a value of 5.2 $\mu m \times g/mol$ corresponds to a radiation window, which comprises a window element of carbon with a thickness of 250 nm and a protection film of silicon with a thickness of 80 nm.

In particular in case that the window element is a thick membrane as discussed above, the criterion sum is preferably at most 27 $\mu m \times g/mol$. For example, the criterion sum with a value of 14.3 $\mu m \times g/mol$ corresponds to a radiation window, which comprises a window element of carbon with a thickness of 1 $\mu m$ and a protection film of silicon with a thickness of 80 nm.

It is further possible that the criterion sum is at most 0.5 $\mu m \times g/mol$. For example, the criterion sum with a value of 0.2 $\mu m \times g/mol$ corresponds to a radiation window, which comprises a window element of carbon with a thickness of 5 nm and a protection film of silicon with a thickness of 5 nm.

A radiation window fulfilling the criterion of the criterion sum, in particular a radiation window with a thickness of 250 nm or less, shows also sufficient transmissivity for low energetic radiation of, for example, 50 eV.

According to at least one embodiment of the radiation window, the window element comprises at least one of the following materials: carbon, graphene, graphite, boron nitride, diamond, borophene, silicon dioxide. Additionally or alternatively, the window element comprises at least one of the following materials: multilayer graphene, bi-layer graphene, tri-layer graphene, exfoliated graphene, few-layer graphene, a graphene-based material, a graphene family material, nanocrystalline graphene, pyrolytic graphene, pyrolytic carbon, graphitic carbon, graphenic carbon, glassy carbon, pyrolyzed polymer films, layered sheet of crystallized 2D carbon, highly oriented pyrolytic graphite (HOPG), natural graphite comprising a hexagonal structure, borophene, hexagonal boron nitride, cubic boron nitride, amorphous boron nitride. In particular, the window element and/or the frame may comprise sp2-hybridized carbon. In particular, the window element and/or the frame may comprise graphitized carbon that has a high sp2 bond content. That is in particular that the window element and/or the frame is predominantly sp2-hybridized. This allows a better low-energy transmission performance compared to beryllium, without the toxicity.

According to at least one embodiment of the radiation window, the protection film comprises at least one of the following materials: boron nitride, silicon, aluminum oxide, silicon dioxide. Additionally or alternatively, the protection film comprises at least one of the following materials: hexagonal boron nitride, cubic boron nitride, boron carbide, boron trioxide, boron silicon, carbon nitride, silicon carbide, silicon nitride, silicon oxide, aluminum nitride, aluminum fluoride, calcium fluoride ($CaF_2$), magnesium fluoride ($MgF_2$), dolomite ($CaMg(CO_3)_2$), magnesite ($MgCO_3$), olivine $(Mg, Fe)_2[SiO_4]$, enstatit ($MgSiO_3$), serpentine ($Mg_3[Si_2O_5](OH)_4$), talc ($Mg_3[Si_4O_{10}](OH)_2$), sepiolite ($Mg_4[Si_6O_{15}](OH)_2$), schönite ($K_2Mg(SO_4)_2 \cdot 6 H_2O$), carnallite ($KMgCl_3 \cdot 6 H_2O$), spinel $MgAl_2O_4$), albite ($NaAlSi_3O8$), anorthite ($(Na,Ca)[(Si,Al)_4O8]$), fluorapatite ($Ca_5[Fl(PO_4)_3]$), topaz ($Al_2SiO_4$), other fluorite minerals.

According to at least one embodiment of the radiation window, the radiation window and/or the window element do not interact with radiation emitted by the radiation source and/or to be detected by the radiation detector during operation. That is, the radiation window does not significantly interact with radiation passing the radiation window. For example, a material and/or a thickness of the radiation window, the window element and the protection film are formed such that no significant interaction with passing radiation takes place.

According to at least one embodiment of the radiation window, the window element comprises a target. It is possible that the window element forms the target. Alternatively, a target material is arranged on the window element. In particular, if the radiation source is an X-ray source a target is needed to generate X-rays. In particular, the X-rays are generated as bremsstrahlung when accelerated electrons are stopped or decelerated at the target.

Alternatively the target may be arranged behind the window element. In this case the window element is at a distance to the target. For example, the target is arranged in a housing sealed by the window element. In this case the X-rays in particular pass the window element in a direction traverse to an electron beam generating the X-rays at the target as bremsstrahlung. Such a window element is also referred to as a side exit transmission window. In this case, a thickness of the window element is between 50 nm and 250 nm.

According to at least one embodiment of the radiation window, the protection film comprises a central region and an edge region. In particular, the edge region at least partially surrounds the central region in lateral directions. Furthermore, a material composition of the protection film in the central region may be different from a material composition of the protection film in the edge regions. "Lateral directions" are in particular directions that extend parallel to the first main surface of the window element.

In particular, a material composition of the protection film in the central region is different from a material composition in the edge region if at least one material is different. Preferably, the protection film in the edge regions comprise different materials than the protection film in the central region. For example, the protection film in the edge regions comprises at least one metal or at least one alloy or may consist of a metal or an alloy. The protection film in the central region preferably comprises at least one dielectric material or consist of at least one dielectric material. For example, the protection film is electrically insulating in the central region and electrically conductive in the edge region.

The edge region preferably surrounds the central region completely in lateral directions. In particular in view of the first main surface, the edge region forms a closed ring or frame around the central region. The edge regions preferably directly adjoin the central region. An outer contour of the edge region preferably matches an outer contour of the protection film.

If the radiation window comprises a frame, the edge region preferably at least partially covers the frame in view of the first main surface. For example, the edge region covers the frame completely in view of the first main surface and terminates flush with the frame in lateral direction. In this case, the central region does not cover the frame in view of the first regions and in particular terminates flush with the frame in lateral direction.

Alternatively, the edge region covers the frame completely and extends beyond the frame in lateral direction.

Furthermore, it is possible that the edge region covers the frame only partially in view of the first main surface. In this case the central region may partially cover the frame in view of the first main surface.

By forming an edge region with a different material composition than the central region, mechanical properties of the radiation window can be improved. For example, the edge region may adjust strain or tension in the protection film such that a dipping of the protection film in the central region is reduced. Furthermore, adhesion of the protection film to the frame can be increased in the edge region. At the same time the frame may be protected against environmental influences by the protection film in the edge region.

Furthermore, an encapsulation for a radiation detector or a radiation source is specified. In particular, the encapsulation comprises a radiation window described herein. That is, all features disclosed for the radiation window are also disclosed for the encapsulation and vice versa. In particular, the radiation detector, or the radiation source, is arranged inside of the encapsulation.

According to at least one embodiment, the encapsulation comprises a housing. In particular, the encapsulation is formed by the housing together with the radiation window. For example, the housing comprises an opening which is closed by the radiation window. Preferably, the opening is hermetically sealed by the radiation window.

For example, the radiation window is attached to the housing by means of sintering, soldering, welding, gluing or the like. In particular, soldering may comprise soft soldering, hard soldering and/or laser soldering. For example, welding may comprise soft welding, hard welding and/or laser welding. For example, the radiation window is attached to the housing by means of the contact metal, in particular if the radiation window is attached to the housing by means of soldering or welding.

According to at least one embodiment of the encapsulation, the encapsulation is configured to sustain a vacuum. For example, the vacuum is present inside the encapsulation. That is, the vacuum is in particular in the vicinity of the radiation source or the radiation detector.

According to at least one embodiment of the encapsulation, the radiation source is an X-ray tube and the radiation window comprises a thickness of at least 0.5 μm and/or at most 2 mm or at most 100 μm or at most 5 μm. Such a thick radiation window is particularly suitable since it is comparatively mechanically robust. That is, the vacuum is sustained comparatively easily.

According to at least one embodiment of the encapsulation, the radiation detector is configured to detect electrons or X-rays or the radiation source is a cathode ray source. In this case, the radiation window preferably comprises a thickness of at most 500 nm or at most 300 nm. With such a thin radiation window, electrons of the cathode rays may be easily transmitted through the radiation window. Preferably, the window element of the radiation window is a membrane in this embodiment.

According to at least one embodiment of the encapsulation, the protection film extends to the housing and at least partially covers the housing, for example in a view of the first main surface. By applying the protection film to at least a part of the housing, this part may be protected against environmental influences, and/or a plasma comprising free ions, free radicals and/or highly reactive metastable molecules generated from radiation to be detected by the radiation detector or radiation emitted from the radiation source.

Furthermore, a method for producing an encapsulation is specified. In particular, an encapsulation described herein can be produced by the method for producing an encapsulation. That is, all features disclosed for the method are also disclosed for the encapsulation and vice versa.

According to at least one embodiment, the method comprises a step of producing a window element. In a subsequent step, the protection film is disposed on the first main surface of the window element to form the radiation window. Furthermore, the protection film is preferably configured to be robust. The ratio between a Young's and an indentation modulus of the window element is preferably between 0.5 and 2.

According to at least one embodiment of the method, the opening of a housing is closed by the window element such that the housing is hermetically sealed and the first main surface faces away from the interior of the housing. In particular, the window element is configured to sustain a pressure difference of at least 1 atm.

According to at least one embodiment of the method, a vacuum is generated in the housing sealed by the radiation window. Preferably, the radiation detector and/or the radiation source is arranged inside the housing.

According to at least one embodiment, material of the window element is deposited as part of a solid state detector or source. In this case the thickness of the material of the window element is at most 20 nm. According to at least one embodiment a detective area of the radiation detector or an emissive area of the radiation source is covered with a protective film or also the electric contact material is covered or the window element is also the electric contact material. In this present embodiment, the radiation detector or the radiation source is a GIS detector or source respectively. That is, the window element is provided with an electrical potential during operation as described above.

According to at least one embodiment of the method, the window element is produced by a chemical vapor process, in particular by low-pressure CVD (LPCVD). Additionally or alternatively, the window element is produced by a different chemical vapor deposition (CVD) method such as atmospheric pressure CVD (APCVD), plasma-enhanced CVD (PECVD), pulsed chemical vapor deposition (PCVD). It is also possible that the window element is produced by a physical vapor deposition (PVD) method such as thermal laser epitaxy, pulsed laser deposition (PLD) or electron-beam PVD. Additionally or alternatively, the window element is at least partially produced by a transfer method, a catalytic deposition or a solid phase process such as graphenization or pyrolysis. In this embodiment, the window element preferably comprises carbon.

For example, if the window element and/or the protection film comprises a glassy carbon, a photoresist is applied to a substrate, in particular by a spin-on process. Subsequently, the photoresist and/or the substrate are thinned in order to achieve the desired thickness of the window element and/or the protection film, respectively. In a further step, the photoresist is thermally treated with a temperature of between 400° C. and 2000° C. to form a glassy carbon. This thermal treatment may be a pyrolysis process.

According to at least one embodiment of the method, the radiation window is attached to the housing by means of sintering, soldering, welding and/or gluing. In particular if the radiation window is attached by soldering, welding, sintering or gluing the radiation window may comprise a contact metal which acts as a bonding agent.

If the radiation window is attached by a soldering process, the soldering process is, for example, brazing, soft-soldering, glass-soldering, laser-soldering, electrical resistance soldering, induction soldering, furnace soldering, reflow-soldering or a eutectic process.

If the radiation window is attached by a welding process, the welding process is, for example, laser welding, hot welding, plasma arc welding, atomic hydrogen welding, gas welding, submerged arc welding, flux-cored arc welding, gas tungsten arc welding, shielded metal arc welding, gas metal arc welding, cold welding, electron beam welding and/or resistance welding.

According to at least one embodiment of the method, the protection film is disposed on the window element if the window element closes the opening of the housing such that the protection film extends to the housing and at least partially covers the housing. By at least partially covering the housing with the protection film, the housing may be protected against environmental influences, radiation, for example a plasma comprising free ions, free radicals and/or highly reactive metastable molecules generated from radiation to be detected by the radiation detector or radiation emitted from the radiation source or other influences mentioned above. It is possible that the encapsulation is not completely closed or sealed after the protection film is arranged on the window element and the housing. For example, the housing is afterwards attached to a mounting member on which the radiation detector and/or the radiation source is arranged. For example, the mounting member is a tube of an X-ray tube and the housing is a lid of the X-ray tube.

Further advantages and advantageous embodiments and further developments of the radiation window, the encapsulation and the method for producing an encapsulation will become apparent from the following exemplary embodiments shown in connection with schematic drawings. Identical elements, elements of the same kind or elements having the same effect, are provided with the same reference signs in the figures. The figures and the proportions of the elements shown in the figures are not to be regarded as true to scale. Rather, individual elements may be shown exageratedly large for better representability and/or for better comprehensibility.

BRIEF DESCRIPTION OF THE DRAWINGS

In the figures:

FIGS. 27A-B and 28 show schematic section views of a solid state detector or electron source comprising a radiation window described herein;

Sections for the sectional views in the figures are taken along a plane orthogonal to a main extension plane of the window element in every figure.

DETAILED DESCRIPTION OF ILLUSTRATIVE EMBODIMENTS

Figure 1:
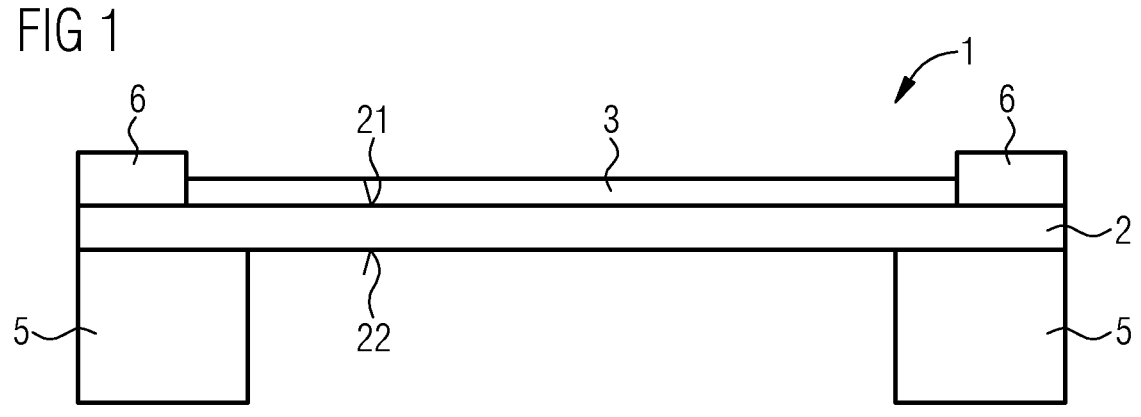
FIGS. 1 to 16 show schematic sectional views of a radiation window described herein according to several exemplary embodiments.

FIG. 1 shows a radiation window 1 in a sectional view according to an exemplary embodiment. The radiation window 1 comprises a window element 2 with a first main surface 21 and a second main surface 22 opposing each other. The window element 2 comprises carbon and is formed, for example, with pyrolytic carbon. A lateral extension, measured parallel to the first main surface 21 of the window element 2 is, for example, between 0.2 cm and 10 cm. A protection film 3 is arranged at the first main surface 21. The protection film 3 is formed with, for example, silicon.

In the present embodiment the radiation window 1 is configured to be used as a radiation window for a radiation detector. The radiation detector is, for example, configured to detect X-rays. The radiation detector may be a silicon drift detector. Alternatively, the radiation window 1 may be used for a radiation source, in particular a source for cathode rays or an X-ray tube.

In the case that the radiation window 1 is configured to be used for a radiation detector 40 or a source for cathode rays, the thickness of the window element 2 together with the protection film 3 is, for example, at most 330 nm. In this case, the thickness of the window element 2 is about 250 nm and the thickness of the protection film 3 is, for example, around 80 nm.

In the case that the radiation window 1 is configured to be used for an X-ray tube, the thickness of the window element 2 together with the protection film 3 is, for example, at least 0.5 μm.

The protection film 3 is configured to protect the window element 2. To achieve this, the protection film 3 is robust against environmental influences such as free ions and/or free radicals that are generated by the radiation to be detected out of the atmosphere, for example due to ionization. Furthermore, the protection film 3 protects the window element 2 from environmental influences such as moisture or physical erosion.

The radiation window 1 is configured to sustain a pressure difference of at least 1 atm. In application, the radiation window 1 is in particular part of an encapsulation 10 for the radiation detector 40 or the radiation source 50 (compare FIGS. 15 and 16), which is arranged inside the encapsulation 10. In this case the first main surface 21 faces the outside of the encapsulation 10 and the second main surface 22 faces the inside of the encapsulation 10. In the encapsulation 10 a vacuum is established in order to keep atmosphere and undesired ionization away from the detector 40 or source 50. Inside the encapsulation 10 the pressure is, for example, below $10^{-1}$ mbar, and outside the encapsulation 10 the pressure is, for example, about 1 atm. That is, the pressure difference is given by a difference of a pressure in the vicinity of the first main surface 21 and in the vicinity of the second main surface 22.

In order to achieve that the radiation window 1 can sustain a pressure difference of at least 1 atm, the window element 2 comprises a Young's modulus of at least 70 GPa and at most 180 GPa, and an indentation modulus of between 77 GPa and 181 GPa. A ratio between a Young's modulus and an indentation modulus of the window element 2 is between 0.5 and 2.

The window element 2 is arranged on a frame 5. The frame 5 is arranged at the second main surface 22. The frame 5 is formed, for example, with silicon. In particular, the frame 5 mechanically stabilizes the window element 2 together with the protection film 3.

The first main surface 21 is partially covered by the protection film 3. Besides the protection film 3, a contact metal 6 is arranged on the first main surface 21 such that the first main surface 21 is completely covered by the protection film together with the contact metal 6. By the contact metal 6, a mechanical connection to a housing 11 of the encapsulation 10 is possible (compare FIG. 18). In the present embodiment the contact metal 6 is gold.

Figure 2:
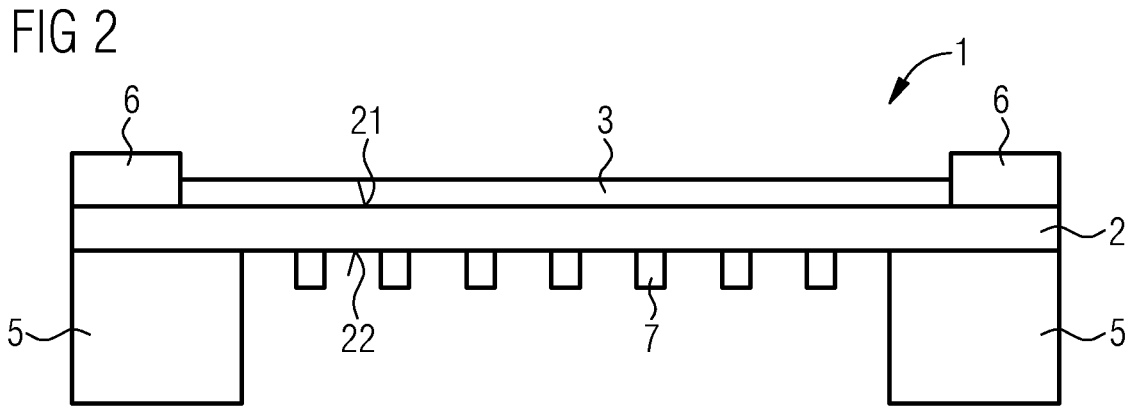

In contrast to FIG. 1, the window element 2 according to FIG. 2 additionally comprises a support structure 7. The support structure 7 mechanically supports the window element 2. The support structure 7 is formed with silicon in the present exemplary embodiment but can be also be formed from any material of the frame 5 or the window element 2. By the support structure 7, a larger lateral extension of the window element 2 is possible. Furthermore or alternatively, due to the mechanical support of the support structure 7, the window element 2, together with the protection film 3, can be formed particularly thin. This allows for a good transmissivity of radiation to be detected or emitted by the radiation detector 40 or the radiation source 50, respectively.

Figure 3:
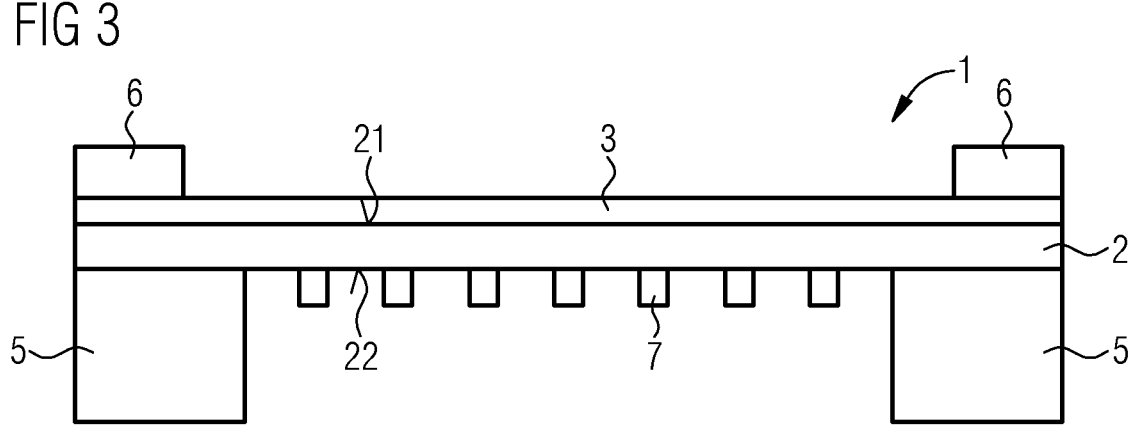

In contrast to FIG. 2, the first main surface 21 is completely covered by the protection film 3 in the radiation window 1 according to FIG. 3. That is, the protection film 3 is in direct contact with the whole first main surface 21. The contact metal 6 is arranged on a side of the protection film 3 facing away from the window element 2.

Figure 4:
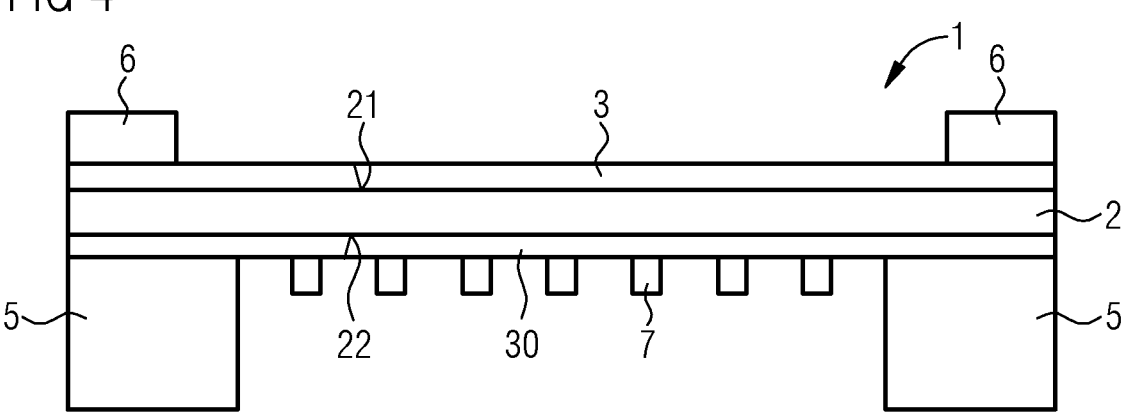

In contrast to FIG. 3, the radiation window 1 according to FIG. 4 additionally comprises further protection film 30. The further protection film 30 is arranged in direct contact with the second main surface 22 and covers the second main surface 22 preferably completely. The further protection film 30 comprises the same features as the protection film 3. The further protection film 30 is arranged between the frame 5 and the window element 2 as well as between the support structure 7 and the window element 2.

By the further protection film 30, the window element 2 is protected against internal influences at the second main surface 22.

Figure 5:
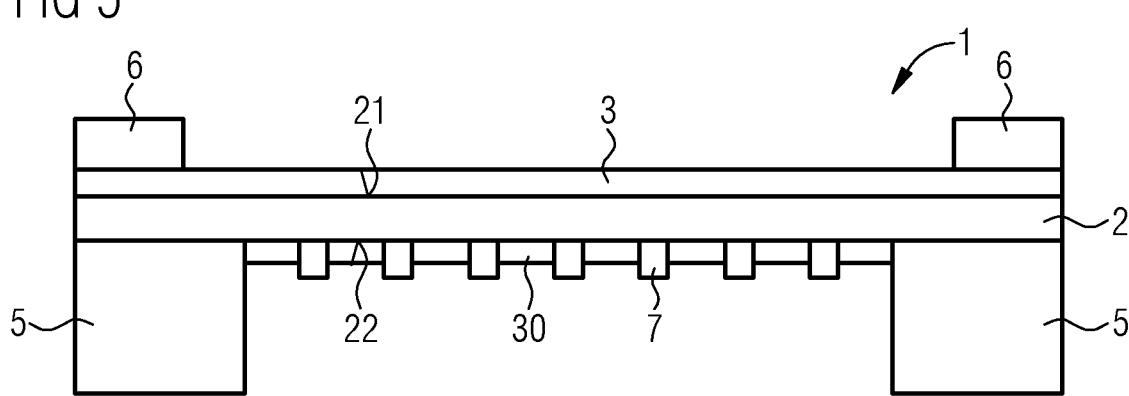

In contrast to FIG. 4, the further protection film 30 of the radiation window 1 according to FIG. 5 is arranged between the support structure 7 along the second main surface 22. That is, the second main surface 22 is in direct contact to the frame 5, the further protection film 30 and the support structure 7.

Figure 6:
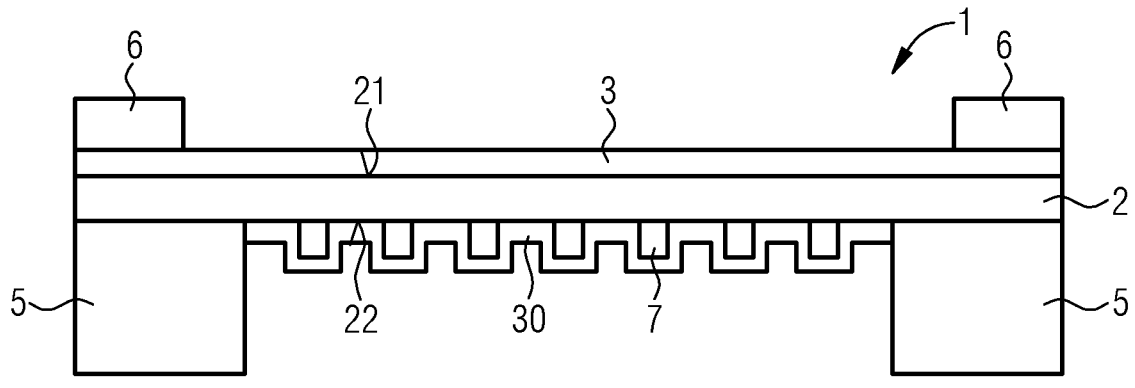

In the exemplary embodiment according to FIG. 6, the further protection film 30 covers the support structure 7 on all sides that are not in contact with the window element 2. This configuration allows the support structure 7 to be particularly efficiently protected by the further protection film 30. For example, the further protection film 30 is applied to the window element 2 after formation of the support structure 7 during production of the radiation window 1. In other aspects, the radiation window 1 according to FIG. 6 comprises the same features as the radiation window 1 of FIG. 5.

Figure 7:
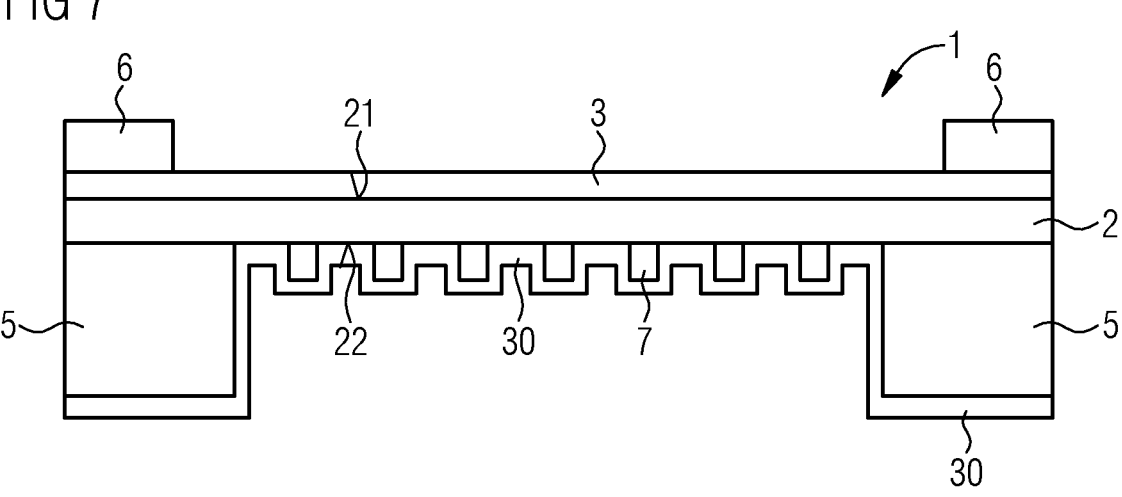

In contrast to FIG. 6, the further protection film 30 of the radiation window 1 according to the exemplary embodiment of FIG. 7 extends to the frame 5 such that a side of the frame 5 facing the support structure 7 and a side of the frame 5 facing away from the window element 2 are covered by the further protection film 30. Advantageously this configuration provides protection for the window element 2 and the frame 5 from radiation or the like including from both a direction of the first main surface 21 and the second main surface 22. For example, during production of the radiation window 1, the further protection film 30 is applied to the window element 2 after the support structure 7 and the frame 5 have been formed.

Figure 8:
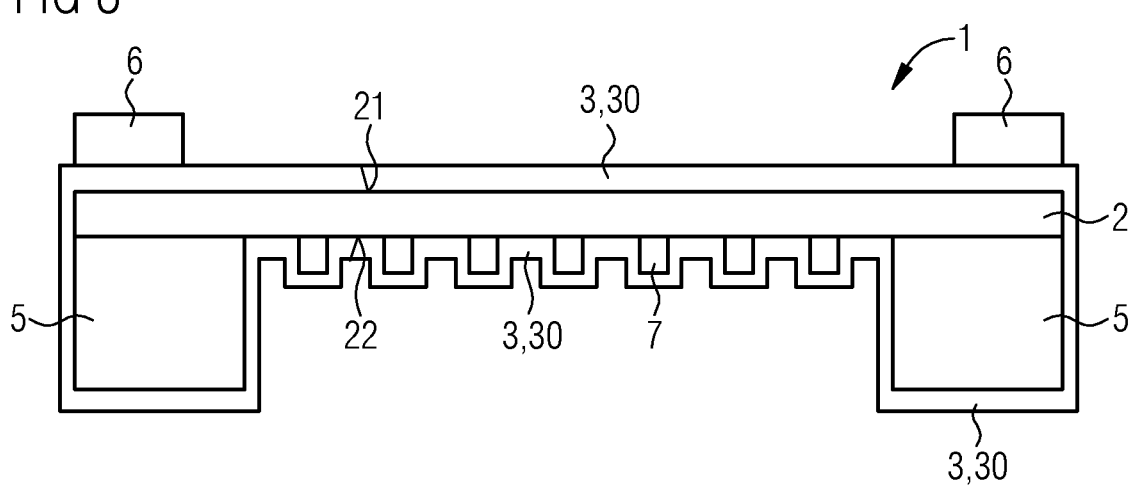

In contrast to FIG. 7, the further protection film 30 and the protection film 3 surround the window element 2 all around together with the support structure 7 and the frame 5 according to the exemplary embodiment of FIG. 8. Preferably, the protection film 3 and the further protection film 30 are formed in one piece. For example, the protection film 3 and the further protection film 30 are formed using the same process or in a single process step. In particular, the protection film 3 and the further protection film 30 are formed after the frame 5 and the support structure 7 have been formed. The contact metal 6 is free of the protection film, except on a side facing the window element 2. By surrounding the window element 2 together with the frame 5 and the support structure 7, these elements can be efficiently protected by the protection film 3 and the further protection film 30 from environmental and internal influences. At the same time, by leaving the contact metal 6 mainly free of the protection film 3, a good adhesion to a housing 11 of an encapsulation 10 can be established.

Figure 9:
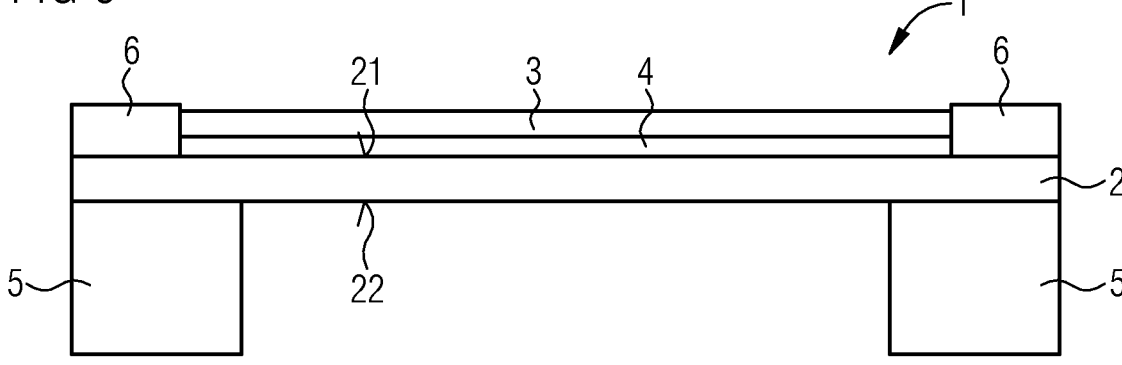

The exemplary embodiment according to FIG. 9 shows in principle the same features as the exemplary embodiment according to FIG. 1 except that a bonding agent layer 4 is arranged between the window element 2 and the protection film 3. The bonding agent layer 4 is configured to increase adhesion between the window element 2 and the protection film 3. In the present embodiment, the bonding agent layer 4 is an additional layer. For example, the bonding agent layer 4 comprises a glue or the like.

In contrast to FIG. 9, it is also possible that the bonding agent layer 4 is a part of the window element 2. In this case, the bonding agent layer 4 is directly arranged at the first main surface 21. In particular, the first main surface 21 is formed by the bonding agent layer 4 at least in places. The bonding agent layer 4 may emerge from a surface preparation of the first main surface 21, by which adhesion between the window element 2 and the protection film 3 may be increased. For example, the first main surface 21 is roughened or chemically treated.

Such a bonding agent layer 4 can be present in all exemplary embodiments and on all surfaces, especially on surfaces in direct or indirect contact with the protection film.

Figure 10:
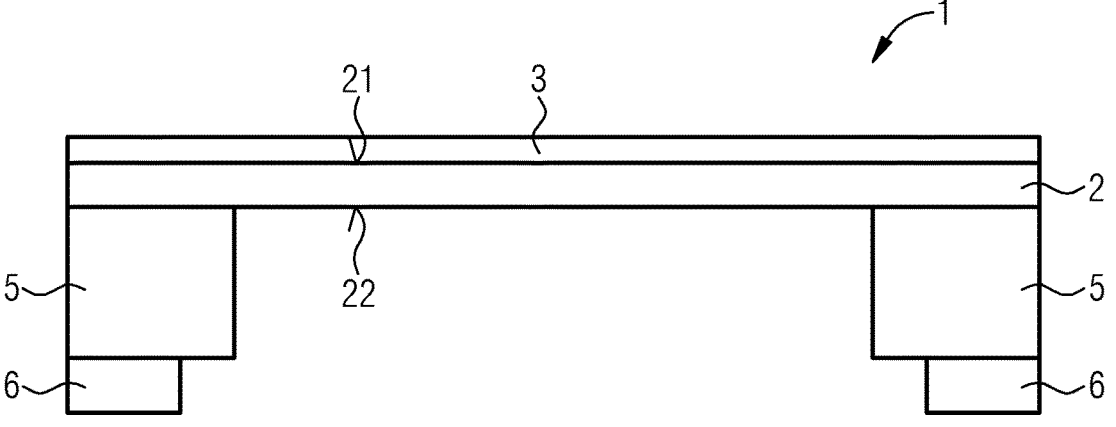

In the exemplary embodiment according to FIG. 10, the contact metal 6 is arranged on the frame 5 on a side facing away from the window element 2. The protection film 3 completely covers the window element 2 in view of the first main surface 21. By arranging the contact metal 6 on the frame 5 as shown in FIG. 10, the frame 5 can be easily attached to another element such as a housing 11 or the like. In other aspects, the exemplary embodiment according to FIG. 10 shows the same features and effects as the exemplary embodiment shown in FIG. 1.

Figure 11:
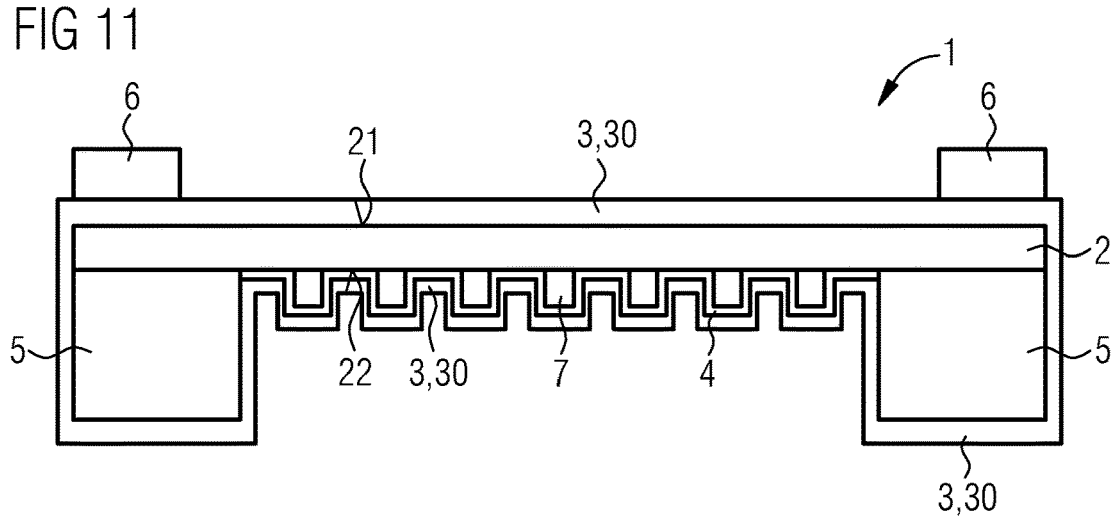

The exemplary embodiment according to FIG. 11 essentially shows the same features as the exemplary embodiment of FIG. 8, wherein additionally a bonding agent layer 4 is arranged between the support structure 7 and the second main surface 22.

Figure 12:
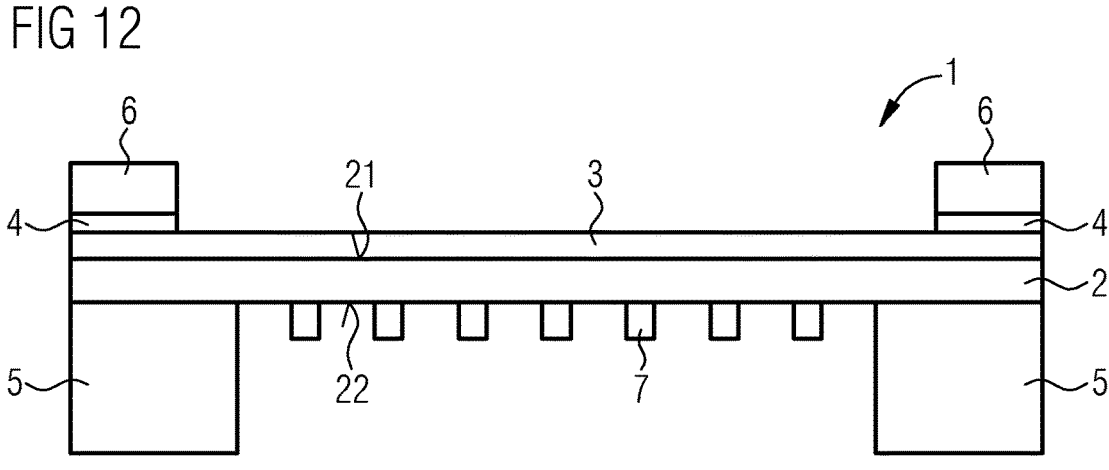

In contrast to FIG. 3, FIG. 12 shows an exemplary embodiment, wherein between the protective film 3 and the contact metal 6 a bonding agent layer 4 is arranged.

Figures 13, 14:
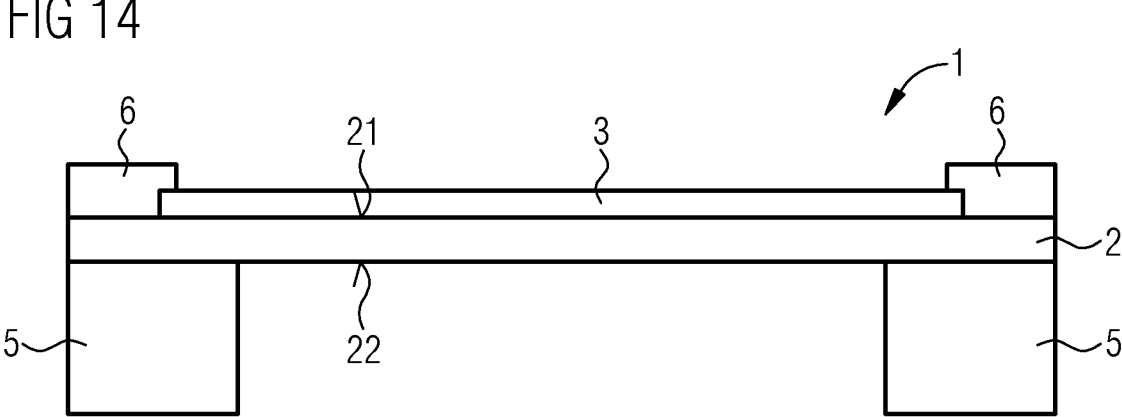

FIG. 13 shows an exemplary embodiment, wherein, in contrast to the exemplary embodiment of FIG. 1 the protection film 3 is arranged at a distance to the contact metal 6. That is, the protection film 3 and the contact metal 6 do not touch each other. The protection film 3 does not completely cover the window element 2 in view of the first main surface 21. However, the protection film 3 covers a recess in the frame 5 as shown in FIG. 13. In this view, the window element 2 is exposed in the regions that are free from the protection element 2 and the contact metal 6.

In contrast to FIG. 13, FIG. 14 shows an exemplary embodiment, wherein the protective film 3 is at least partially arranged between the contact metal 6 and the window element 2. That is, the contact metal 6 covers the protective film 3 at least in places in view of the first main surface 21.

Figure 15:
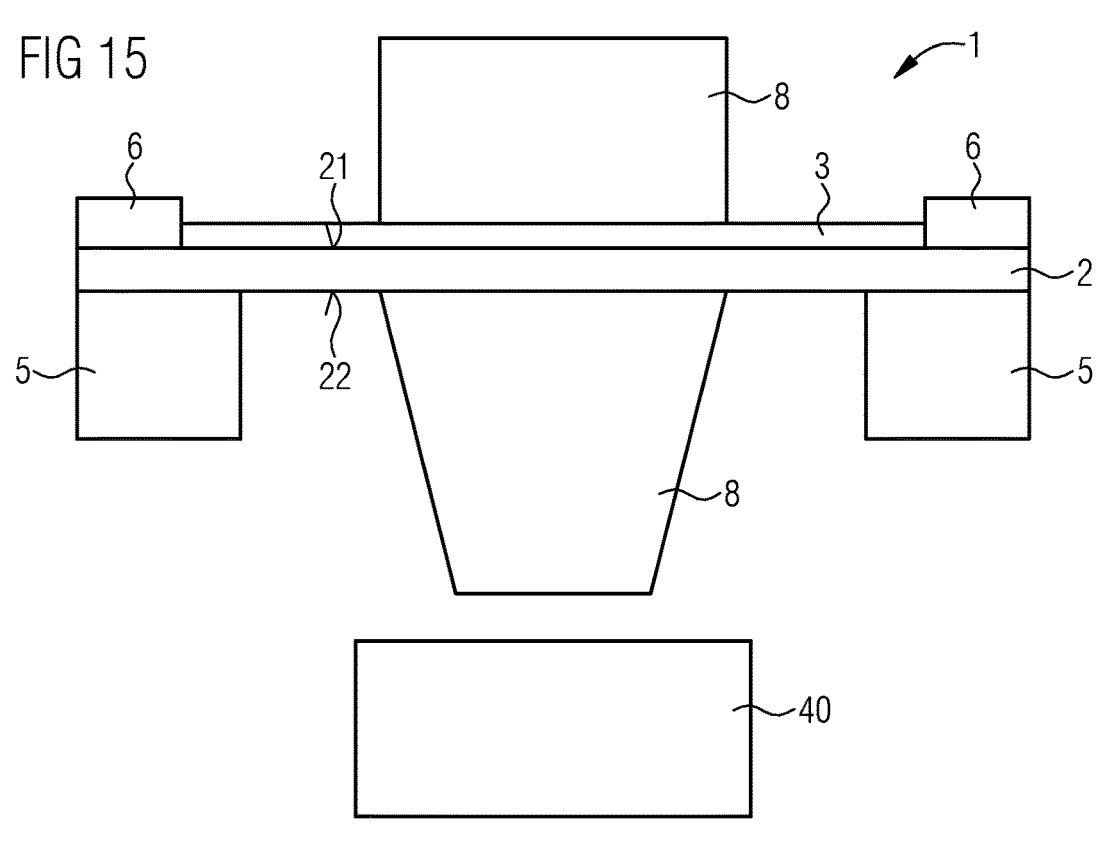

FIG. 15 illustrates the usage of the radiation window 1 for a radiation detector 40. The window element 2 of the exemplary embodiment according to FIG. 10 is further configured to focus radiation 8, which is to be detected by the detector 40. The radiation 8 passes the radiation window 1 from the first main surface 21 to the second main surface 22. Thereby, the radiation is focused on the radiation detector 40. For example, the window element 2 comprises the shape of a lens (not shown) to achieve the focusing. By focusing the radiation 8, the detector 40 may have a comparably smaller lateral extent. It is possible that the radiation detector 40 may be replaced by a radiation source 50. It is further possible that the radiation detector 40 is supplemented by a radiation source 50.

Figure 16:
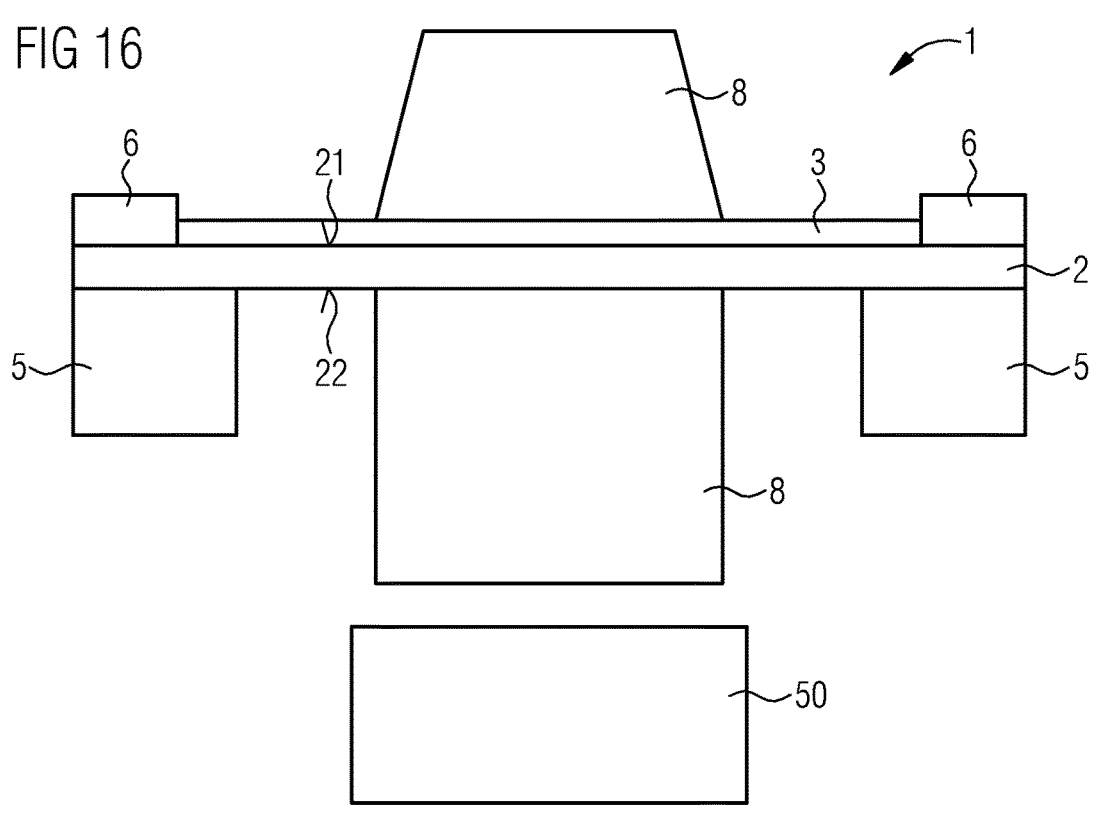

In contrast to FIG. 15, FIG. 16 illustrates the usage of the radiation window 1 for a radiation source 50. The radiation source 50 is, for example, an X-ray tube, wherein the X-rays are generated from accelerated free electrons that are decelerated or stopped at a target. The target may be arranged at a side of the radiation window 1 facing an electron emitter for generating the free electrons. The radiation 8 passes the radiation window 1 in a direction from the second main surface 22 to the first main surface 21. The window element 2 is further configured to focus the radiation 8. Such a focused radiation 8 may be advantageous for an application following the radiation window 1 in a radiation direction of the radiation 8. It is possible that the radiation source 50 may be replaced by a radiation detector 40. It is further possible that the radiation source 50 is supplemented by a radiation detector 40.

In the exemplary embodiments of FIGS. 15 and 16, the window element 2 and/or the protection film 3 may comprise a microstructure or any other suitable means to vary the refractive index along a direction parallel to the main surface such that a focusing occurs. For example, the microstructures form a diffractive grating. Additionally or alternatively, it is possible that the window element 2 and/or the protection film 3 deforms due to a pressure difference. This deformation may cause a diffraction of the radiation 8, resulting in a focusing effect.

Figure 17:
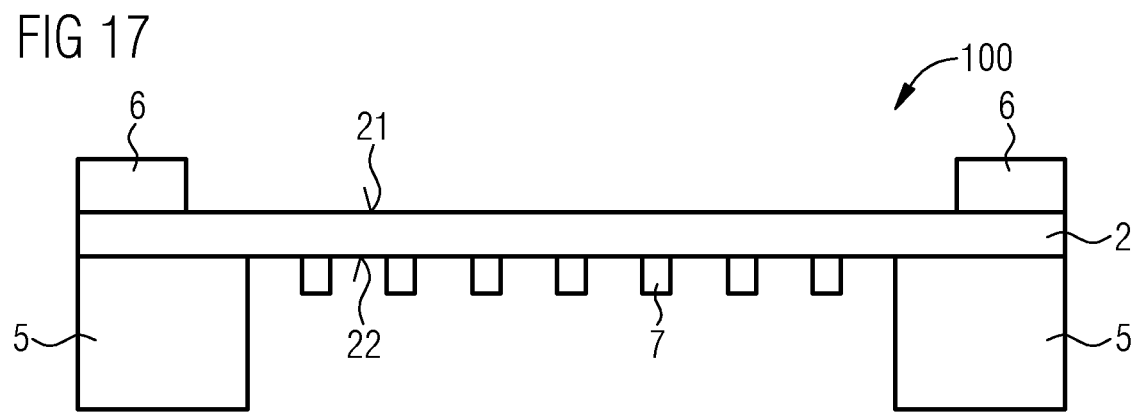
FIG. 17 shows a schematic sectional view of a radiation window according to a comparative example.

FIG. 17 shows a comparative example 100 of a radiation window. In contrast to the radiation window 1 described herein, the radiation window of the comparative example 100 does not comprise a protection film. Therefore, a window element 2 of the comparative example 100 is not protected against environmental influences and especially not against an oxygen plasma emerging in the vicinity of the first main surface 21 and/or the second main surface 22. That is, the window element 2 may degenerate over time. Hence the radiation window according to the comparative example 100 comprises a shorter lifespan than the radiation window 1 described herein.

Figure 18:
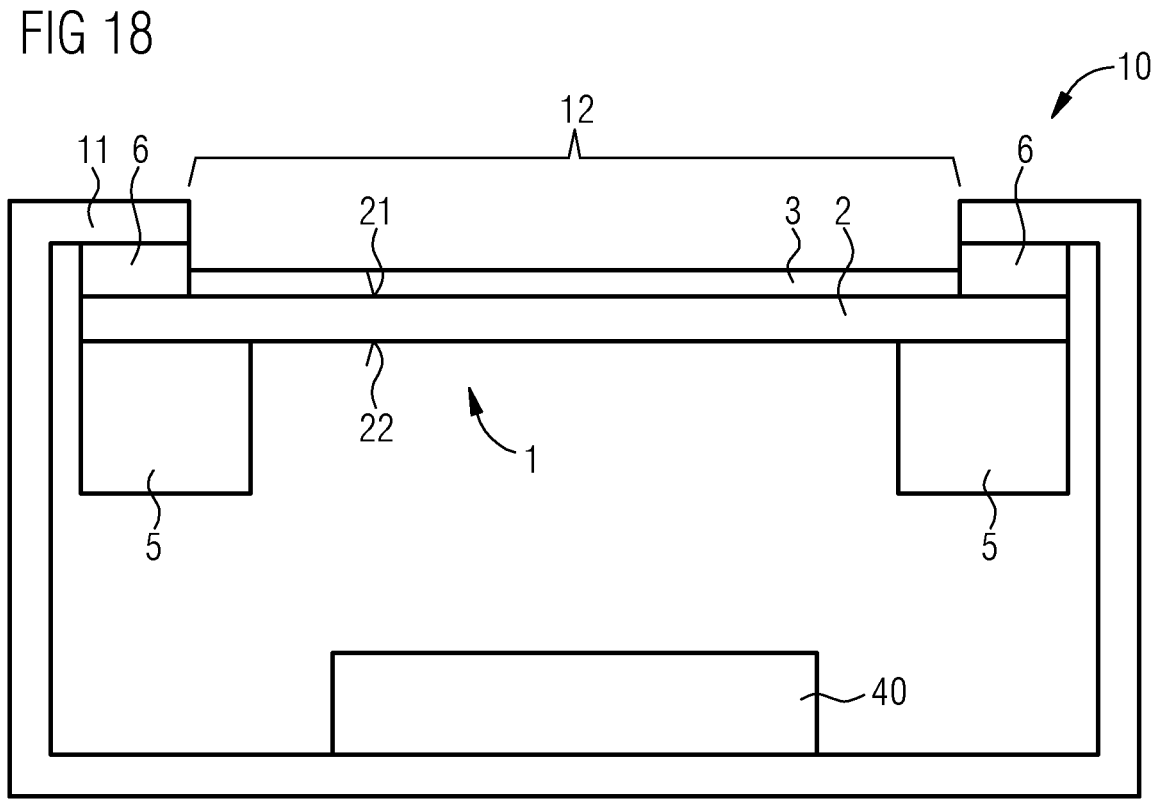
FIGS. 18 to 26 show schematic sectional views of an encapsulation described herein according to several exemplary embodiments.

FIG. 18 shows an encapsulation 10 for a radiation detector 40 according to an exemplary embodiment. The encapsulation 10 comprises a housing 11, inside which the radiation detector 40 is arranged. An opening 12 of the housing 11 is closed by a radiation window 1. In particular, the housing 11 is hermetically sealed by the radiation window 1. That is, by sealing the opening 12 with the radiation window 1, the encapsulation 10 is configured to sustain a vacuum in its interior. The radiation window 1 is, for example, the radiation window 1 according to FIG. 1. However, the radiation window 1 may be any radiation window 1 according to an exemplary embodiment described above.

The radiation window 1 is attached to the housing 11 by the contact metal 6. For example, the housing 11 is attached to the contact metal 6 by soldering or welding. The housing comprises for example at least one of the following materials: nickel, titanium, steel, kovar, molybdenum, ceramic materials such as $Al_2O_3$.

Figure 19:
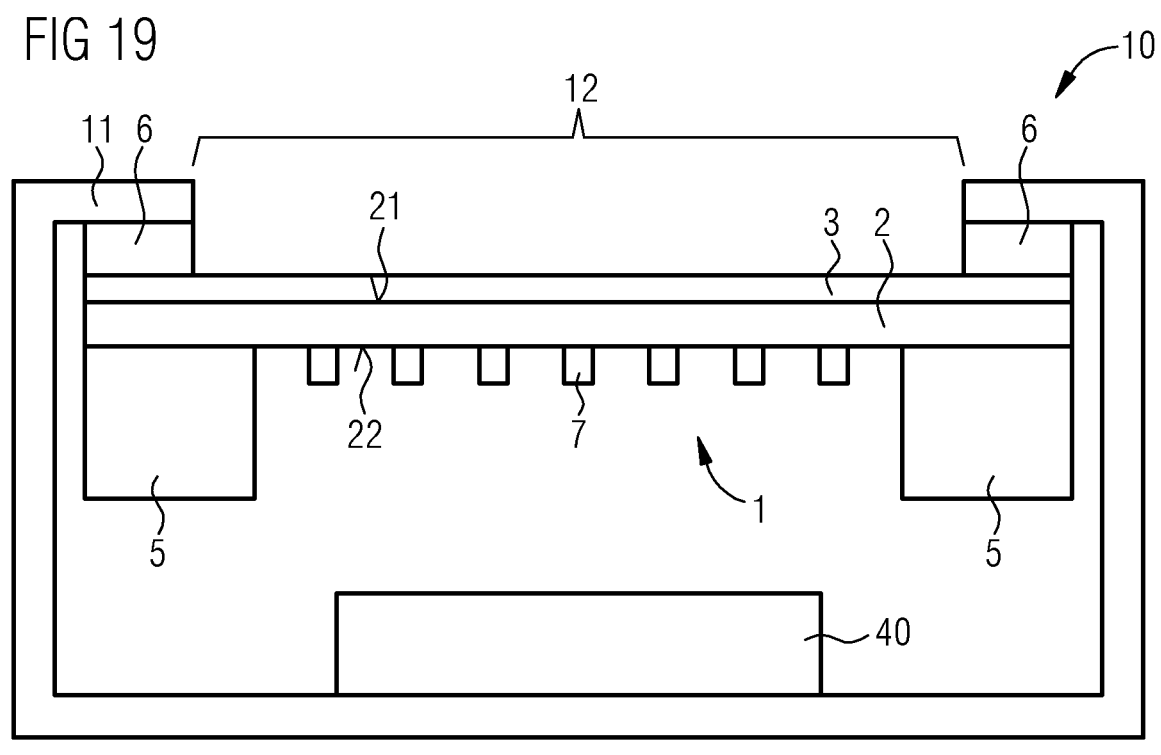

In contrast to FIG. 18, the radiation window 1 used in the exemplary embodiments according to FIG. 19 comprises a support structure 7. For example, the radiation window 1 is the radiation window 1 according to FIG. 2.

Figure 20:
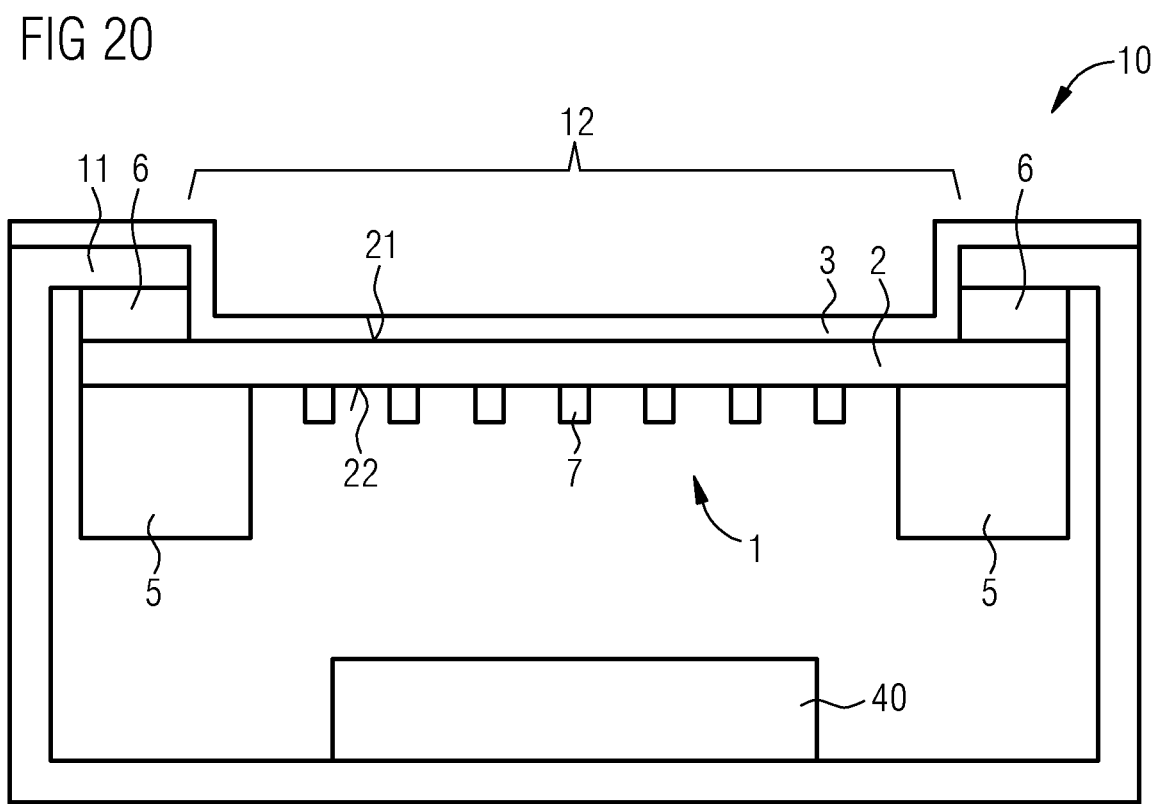

The encapsulation 10 according to the exemplary embodiment of FIG. 20 comprises essentially the same features as the encapsulation 10 of FIG. 19, except that the protection film 3 extends to the housing 11 and covers a side of the housing 11 facing away from the window element 2. In this embodiment, the protection film 3 is preferably applied after the housing 11 has been sealed by the radiation window 1. By extending the protection film 3 to the housing 11, the housing 11 can be efficiently protected.

Figure 21:
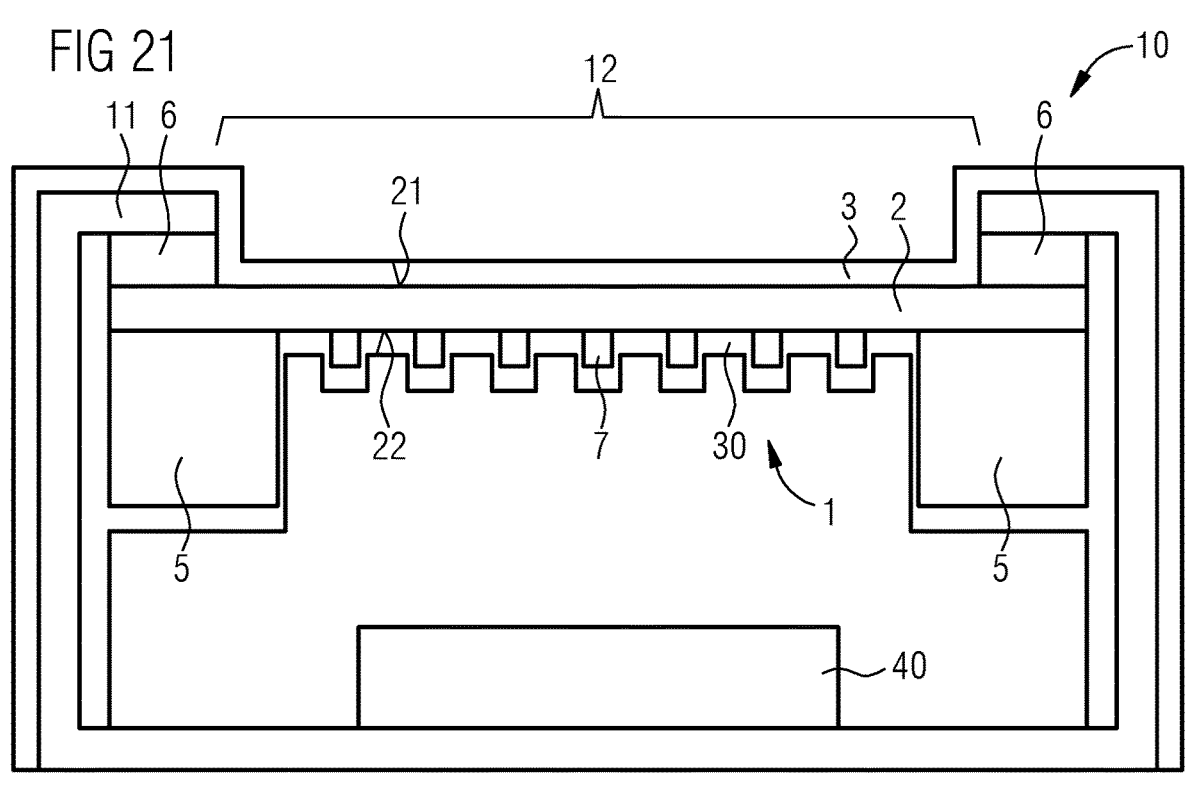
Figure 22:
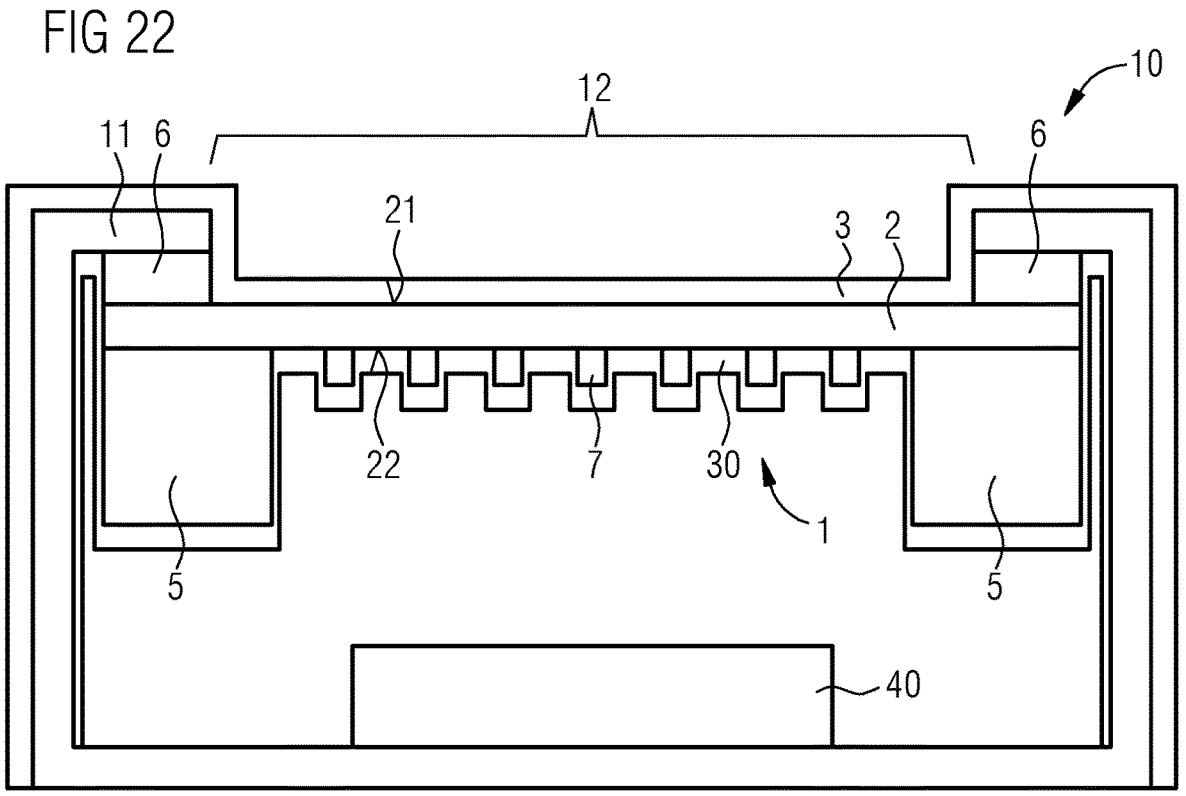

In the exemplary embodiments according to FIGS. 21 and 22, the protection film 3 surrounds the window element 2 together with the support structure 7, the frame 5 and the contact metal 6. Furthermore, the protection film 3 extends to the housing 11 and covers the sides of the housing 11 facing away from the second main surface 22 and extending orthogonal to the second main surface 22.

According to FIG. 21, a gap between the frame 5 and to housing 11 is filled with the protection film 3. With this configuration, an adhesion between the housing 11 and the radiation window 1 may be increased.

According to FIG. 22, a gap between the frame 5 and the housing 11 is present. In such a configuration, the protection film 3 may be arranged particularly thin on the housing 11.

Figure 23:
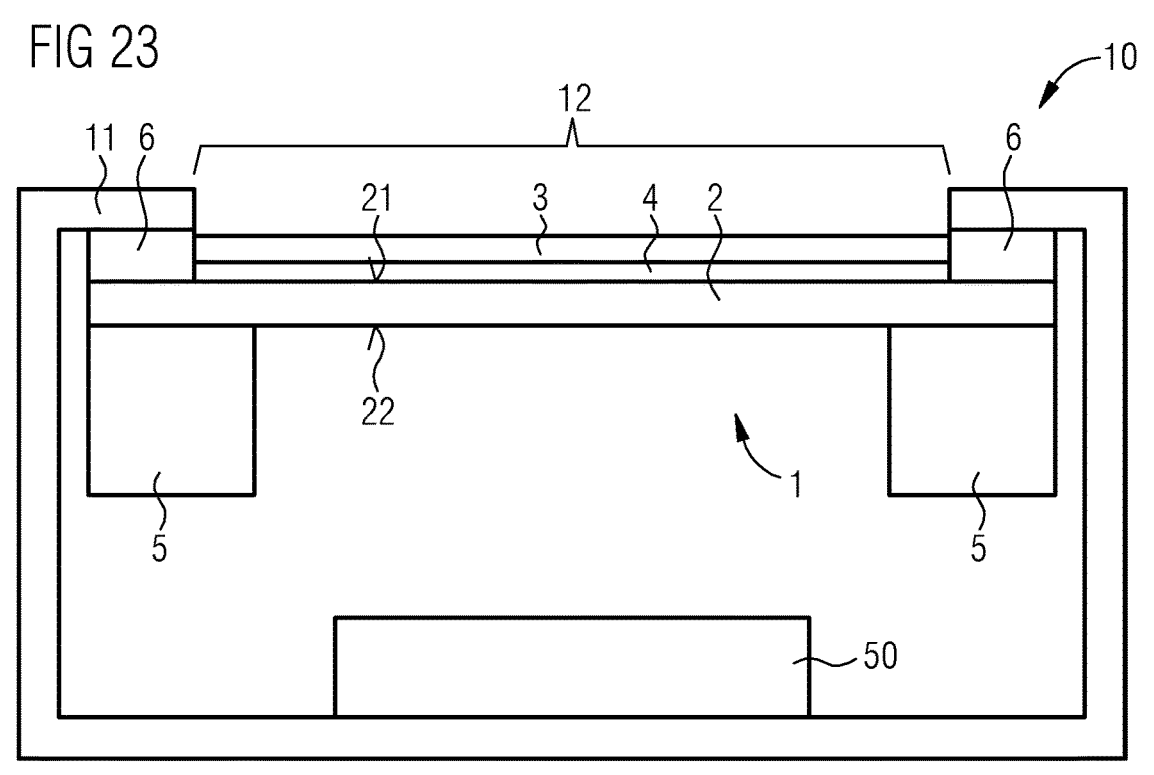

FIG. 23 shows an encapsulation 10 according to an exemplary embodiment, which comprises a radiation window 1 comprising a bonding agent layer 4. For example, the radiation window 1 is the radiation window according to the exemplary embodiment of FIG. 9. Furthermore, in contrast to the encapsulation of the exemplary embodiment of FIG. 18, a radiation source 50 is arranged in the encapsulation 10. The radiation source 50 may comprise an electron emitter for generating free electrons and a cathode and an anode. The electron emitter may be arranged at the cathode. During operation an acceleration voltage can be applied to the cathode and the anode such that the free electrons are accelerated. At a target the accelerated electrons may be decelerated or stopped such that radiation is generated, in particular X-rays as bremsstrahlung. The target may be arranged at the radiation window 1 at a side facing the electron emitter. In other aspects, the encapsulation 10 according to FIG. 23 comprises the same features as the encapsulation 10 according to FIG. 18.

Figure 24:
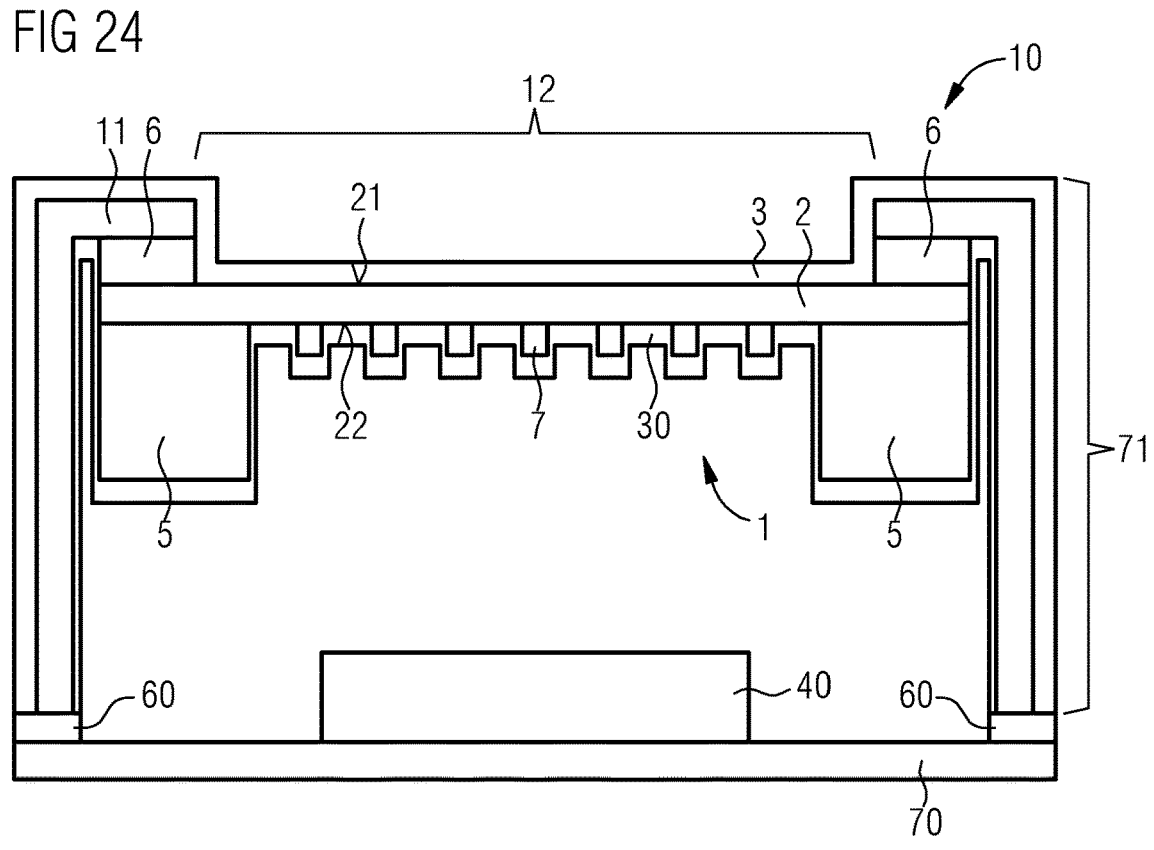

In contrast to the exemplary embodiment of FIG. 22, according to the exemplary embodiment of FIG. 24, the encapsulation 10 comprises a mounting member 70 and a further contact metal 60. In particular, the further contact metal 60 comprises two layers, for example formed with the same or similar materials, connected to each other by a solder. A first layer of the further contact metal 60 may be attached to the lid 71 and a second layer of the further contact metal 60 may be attached to the mounting member 70. By arranging the first and second layer of the further contact metal 60 on the lid 71 and the mounting member 70, respectively, the lid 71 and the mounting member 70 can be connected to each other by soldering.

At the mounting member 70 a radiation detector 40 is arranged. The mounting member 70 is connected to a lid 71. The lid 71 comprises the radiation window 1. The mounting member 70 is connected to the lid 71 via the further contact metal 60. By the further contact metal 60, the lid 71 may be soldered to the mounting member 70. The further contact metal comprises or consist of gold, preferably. In particular, all features disclosed for the contact metal 6 are also disclosed for the further contact metal 60 and vice versa. Preferably, by the further contact metal 60 the encapsulation is hermetically sealed. In particular, the mounting member 70 together with the lid 71 forms the housing 11, respectively the encapsulation 10.

Figure 25:
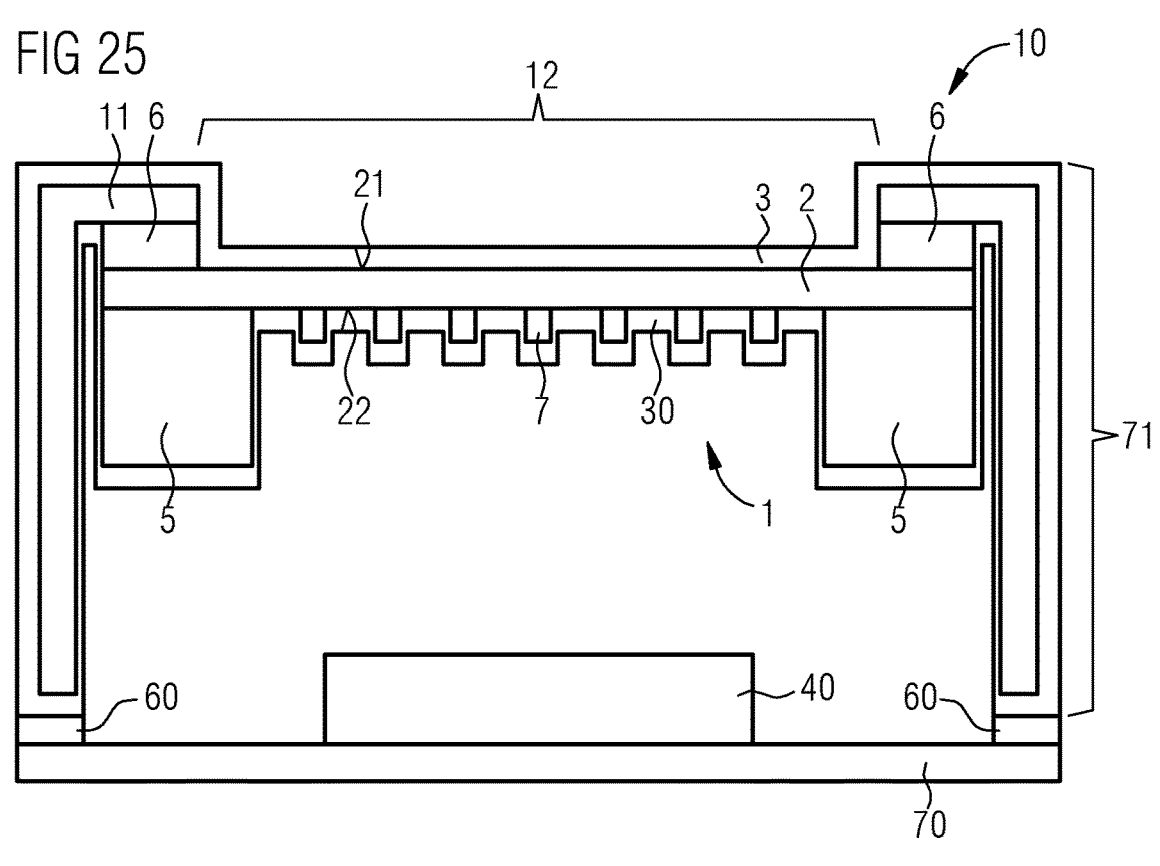
Figure 26:
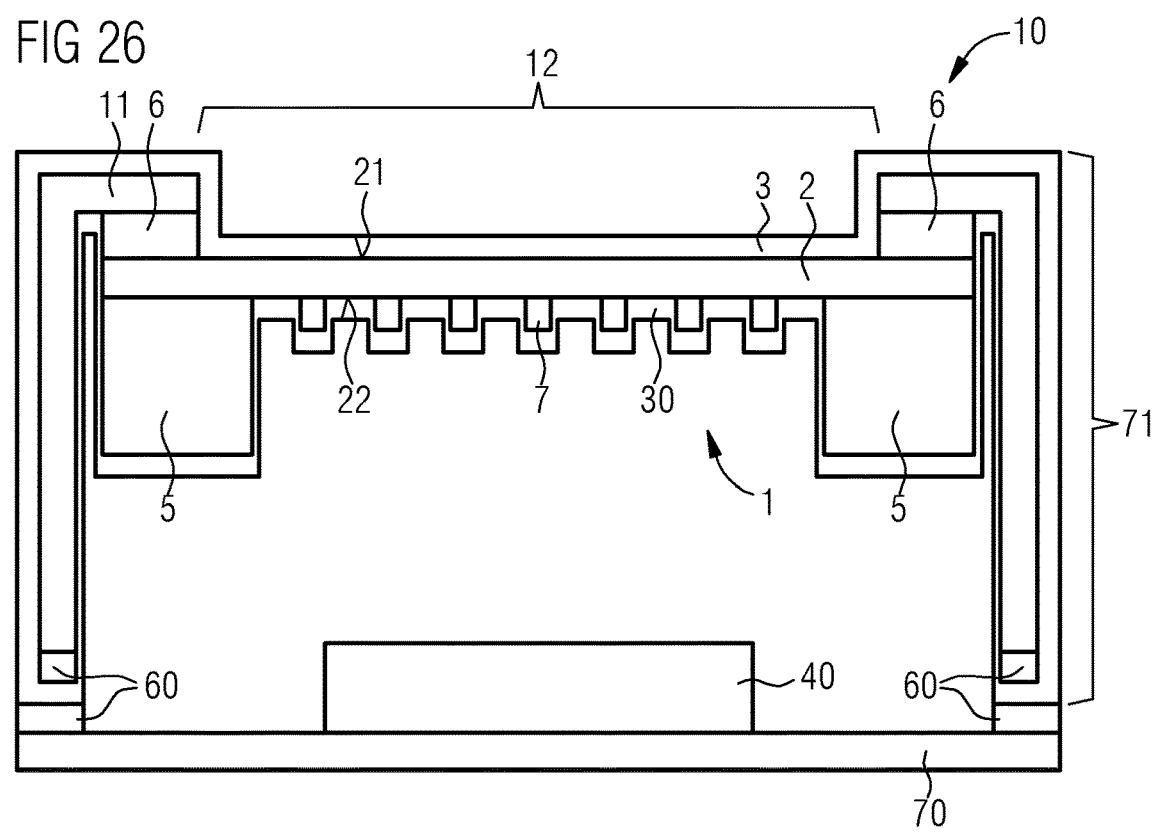

In contrast to FIG. 24, in the encapsulation 10 according to FIG. 25 the protective film 3 is arranged between the further contact metal 60 and the lid 71 and in FIG. 26, the protective film 3 is arranged between two layers of the contact metal 60.

It is in particular possible that all exemplary embodiments of the radiation window 1 can be combined with any exemplary embodiment of the encapsulation 10, even if this combination is not explicitly shown in the Figures or described herein. In particular it is possible that the lid 71 comprises any radiation window 1 disclosed herein.

FIG. 27A shows an electron source 200 comprising a radiation window 1 described herein. The electron source 200 comprises a substrate 201, which is formed with silicon in the present exemplary embodiment. On a first main side of the substrate 201, an oxide layer 202 is arranged. The oxide layer 202 is formed, for example, silicon dioxide. The oxide layer 202 comprises an opening 203 through which electrons may be emitted during operation.

In the opening 203 the radiation window 1 and a barrier layer 204 are arranged. The barrier layer 204 is formed with an oxide. However, the barrier layer 204 may be formed with another material with a band gap leading to a higher energy of the conduction band edge of the barrier layer 204 compared to the substrate 201, such as hexagonal boron nitride. In particular, the band gap of the barrier layer 204 is at least 2 eV. The barrier layer 204 is in direct contact with the substrate 201.

On a side of the barrier layer 204 opposing the substrate 201, a window element 2, followed by a protection film 3 is arranged. The window element 2 and the protection film 3 form the radiation window 1. The window element 2 is formed, for example, with graphene in the present exemplary embodiment. Other possible materials for the window element 2 are for example, pyrolytic carbon, glassy carbon, pyrolytic graphene, CVD graphene, highly oriented pyrolytic graphite, nanocrystalline graphene, graphitic carbon or graphemic carbon. A thickness of the window element 2 is, for example, at least one atomic layer of carbon, i.e., one monolayer, and at most 20 nm. The protection film 3 is formed, for example, with boron nitride and comprises a thickness between 0.3 nm and 20 nm.

The window element 2 extends outside of the opening 203 to a region of the oxide layer 202 facing away from the substrate 201. In this region, the window element 2 is in contact with a metal electrode 205.

During operation of the electron source 200 a voltage is applied to the substrate 201 and the metal electrode 205. The window element 2 is electrically conductive such that the voltage is applied directly at the barrier layer 204. This voltage causes electrons to tunnel through the barrier layer 204. These electrons are emitted through the opening 203, respectively the radiation window 1. It is thus advantageous to form the radiation window 1 relatively thin such that electrons passing the barrier layer 204 can easily pass the radiation window 1 with comparably low scattering and therefore comparably low energy loss, so that the electrons have at the interface between the protection film and the surrounding atmosphere, at least the energy of the work function of the protection film material.

By the protection film 3 the radiation window 1 can thereby be advantageously robust and a lifetime of the window element 2 can be increased.

FIG. 27B shows the radiation window 1 and the layer stack inside the opening 203 in more detail.

FIG. 28 shows an electron source 200 according to further exemplary embodiment. In contrast to FIG. 27, the electron source 200 of FIG. 28 comprises a bonding agent layer 4. In particular the bonding agent layer 4 is arranged between the window element 2 and the protection film 3. The bonding agent layer 4 may comprise the same features as the bonding agent layer 4 of FIG. 9. The bonding agent layer 4 has a thickness below 5 nm. Furthermore, the electron source 200 comprises an adhesive 206 to enhance adhesion between the window element 2 and the metal electrode 205 and the oxide 202 in the region of the metal electrode 205. The adhesive 206 may comprise the same materials as the bonding agent layer 4. It possible that the adhesive 206 and the bonding agent layer 4 are formed in one piece (not shown). It is further possible that the adhesive 206 is arranged over the whole interface between the metal electrode 205 and the window element 2 and/or over the whole interface between the oxide layer 202 and the window element 2 and/or over whole interface between the protection film 3 and the metal electrode 205.

Figure 29:
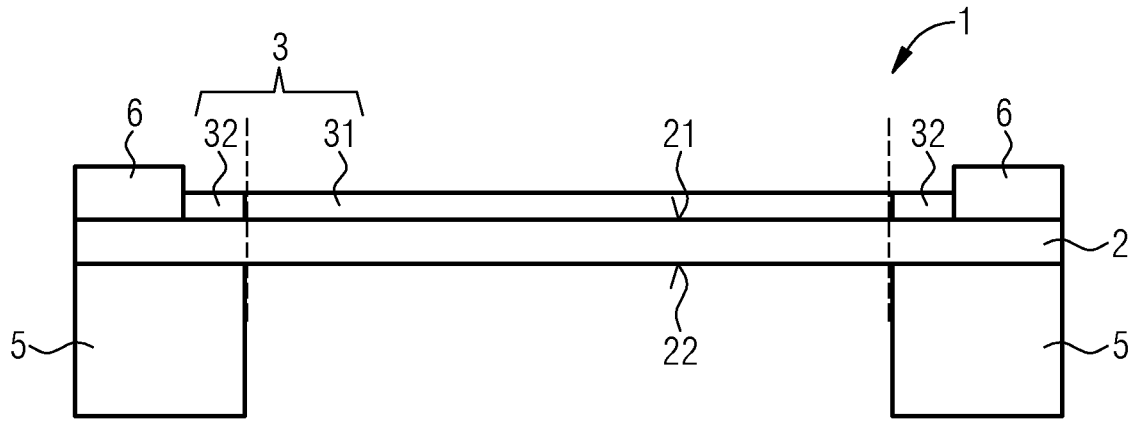
FIG. 29 shows a section view of a radiation window described here according to a further exemplary embodiment.

FIG. 29 shows a radiation window 1 described here according to a further exemplary embodiment in a sectional view. The radiation window 1 shown in FIG. 29 differs from the radiation window 1 according to FIG. 1 in that the protection film 3 comprises a central region 31 and an edge region 32. The central region 31 directly adjoins the edge region 32. The edge region 31 completely surrounds the central region 32 in view of the first main surface 21 (FIG. 30).

A material composition of the protection film 3 in the central region 31 is different from a material composition in the edge region 32. For example, in the central region 31 the protection film 3 is formed with one of the materials described in context with FIG. 1. In the edge region 32 the protection film 3 is formed, for example, with a metal or an alloy. In the present embodiment the protection film 3 may be formed with aluminum in the edge region 32.

Figure 30:
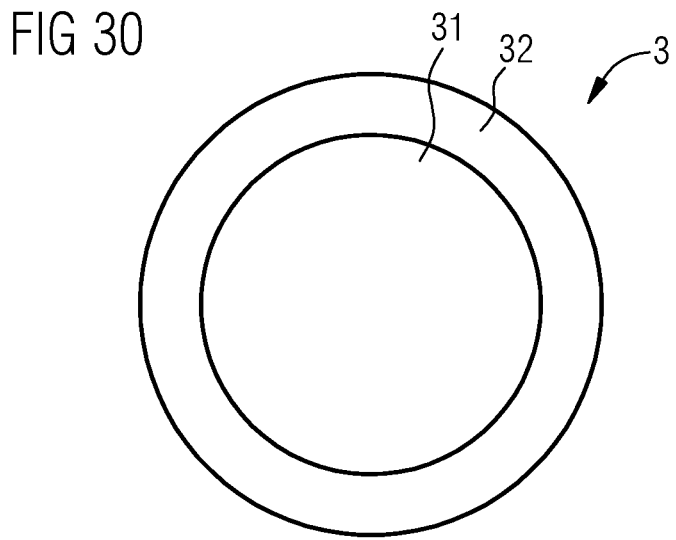
FIGS. 30 to 33 illustrate different exemplary embodiments of a protection film comprising a central region and an edge region.

FIG. 30 illustrates a protection film 3 comprising a central region 31 and an edge region 32, for example, the protection film 3 according to FIG. 29, in view of the first main surface 21. The edge region 32 surrounds the central region 31 completely and forms a closed circular ring.

Figure 31:
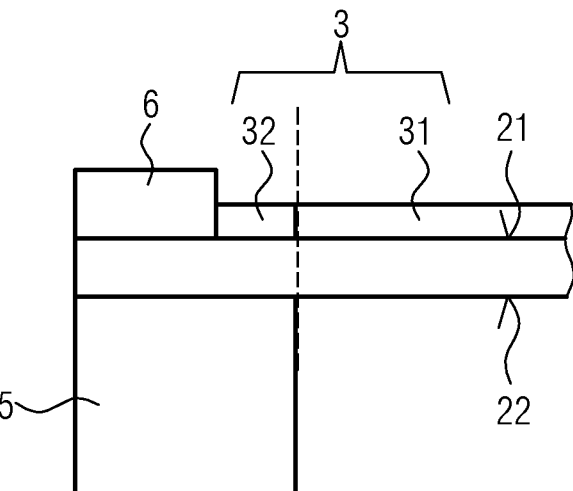
Figure 32:
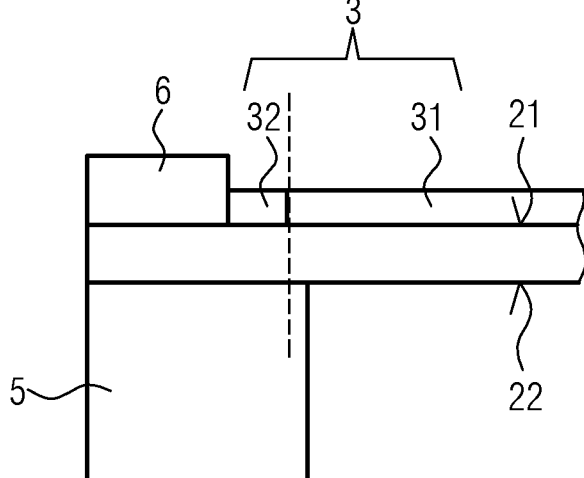
Figure 33:
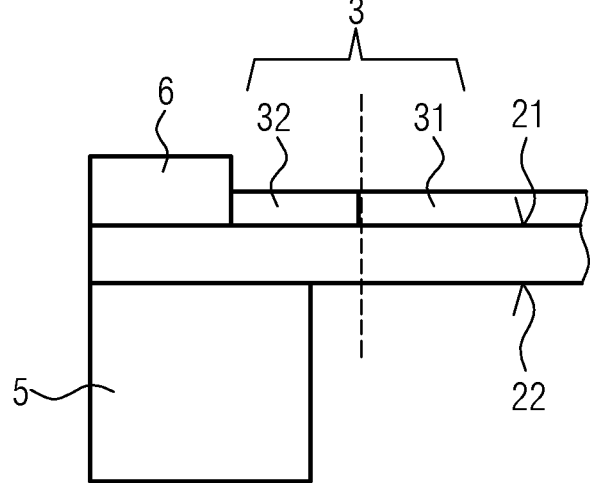

FIGS. 31 to 33 illustrate different examples of the width of the edge region 32. The radiation window 1 comprises, for example, essentially the same features as the radiation window 1 according to FIG. 29. In FIG. 31, the edge region 32, and consequently the central region 31 terminate flush with the frame 5. That is, in view of the first main surface 21, the central region 31 does not cover the frame 5 and the edge region 32 covers the frame 5 completely.

According to FIG. 32, the edge region 32 does not completely covers the frame 5 and a part of the frame is covered by the central region 31.

In FIG. 33, the edge region 32 extends beyond the frame in a direction parallel to the first main surface 21.

In particular, the central region 31 and the edge region 32 may also partially overlap in a region of a contact boundary line between the central region 31 and the edge region 32, not shown in FIGS. 29 to 33. That is, in the region of contact boundary line, the central region 31 may cover the edge region 32 on a lateral extent ranging from 1 μm to 1000 μm, or vice versa.

The same applies to the edge region 32 and the contact metal 6. The edge region 32 and the contact metal 6 may also partially overlap in a region a further contact boundary line between the edge region 32 and the contract metal 6, not shown in FIGS. 29 to 33. That is, in the region of the further contact boundary line, the edge region 32 may cover the contact metal 6 on a lateral extent ranging from 1 μm to 1000 μm, or vice versa.

The invention is not restricted to the exemplary embodiments of the description on the basis of said exemplary embodiments. Rather, the invention encompasses any new feature and also any combination of features which in particular comprises any combination of features in the patent claims and any combination of features in the exemplary embodiments, even if this feature or this combination itself is not explicitly specified in the patent claims or exemplary embodiments.

What is claimed is:

1. A radiation window for a radiation detector or a radiation source, the radiation window comprising:
   a window element;
   a first protection film; and
   a contact metal,
   wherein the first protection film at least partially covers a first main surface of the window element facing away from the radiation detector or the radiation source, and
   wherein the contact metal is arranged on a side of the first protection film facing away from the window element.

2. The radiation window according to claim 1, further comprising
   a second protection film at least partially covering a second main surface of the window element.

3. The radiation window according to claim 1, wherein the window element together with the first protection film is configured to transmit at least 0.1% % of radiation with an energy of 50 eV.

4. The radiation window according to claim 1,
   wherein the window element comprises a thickness between 50 nm and 250 nm, inclusive, and
   wherein the first protection film comprises a thickness between one monolayer and 100 nm, inclusive.

5. The radiation window according to claim 1,
   wherein the window element comprises a thickness between 500 nm and 2 mm, inclusive, and
   wherein the first protection film comprises a thickness between one monolayer and 100 nm, inclusive.

6. The radiation window according to claim 1,
   wherein the window element comprises a thickness between one monolayer and 20 nm, inclusive, and
   wherein the first protection film comprises a thickness between one monolayer and 5 nm, inclusive.

7. The radiation window according to claim 1, further comprising:
   a frame mechanically carrying the window element together with the first protection film,
   wherein the first protection film extends to the frame and at least partially covers the frame in a view of the first main surface.

8. The radiation window according to claim 1,
   wherein the window element is a membrane, and
   wherein the radiation window comprises a support structure mechanically supporting the window element.

9. The radiation window according to claim 8, wherein the support structure is at least partially covered by the first protection film, or a second protection film arranged on a second main surface of the window element.

10. The radiation window according to claim 1, wherein a criterion sum of a product of a thickness of the window element and a mass number of a material of the window element, and a product of a thickness of the first protection film and a mass number of a material of the first protection film, is at most 27 μm×g/mol or at most 6 μm×g/mol or at most 0.5 μm×g/mol.

11. The radiation window according to claim 1, wherein the window element comprises at least one of the following materials: carbon, graphene, graphite, boron nitride, diamond, borophene, or silicon dioxide, and wherein the first protection film comprises at least one of the following materials: boron nitride, silicon, aluminum oxide, or silicon dioxide.

12. The radiation window according to claim 1, wherein the window element and/or the first protection film is configured to focus at least a part of a radiation passing the radiation window.

13. The radiation window according to claim 1, wherein the first protection film comprises a central region and an edge region, wherein the edge region at least partially surrounds the central region in lateral directions, and wherein a material composition of the first protection film in the central region is different from a material composition of the first protection film in the edge region.

14. An encapsulation for the radiation detector or the radiation source comprising:

the radiation window according to claim 1; and a housing, wherein the encapsulation is configured to sustain a vacuum.

15. The encapsulation according to claim 14, wherein the radiation detector is configured to detect cathode rays or X-rays, or wherein the radiation source is a cathode ray source or an X-ray tube, and wherein the radiation window comprises a thickness of at most 500 nm.

16. The encapsulation according to claim 14, wherein the first protection film extends to the housing and at least partially covers the housing in a view of the first main surface.

17. A method for producing an encapsulation, the method comprising:

producing a window element;

disposing a protection film on a first main surface of the window element to form a radiation window; and disposing a contact metal, wherein the contact metal is arranged on a side of the protection film facing away from the window element.

18. The method according to claim 17, further comprising:

closing an opening of a housing by the window element such that the housing is hermitically sealed and the first main surface faces away from an interior of the housing, wherein the window element is configured to sustain a pressure difference of at least 1 atm, wherein a vacuum is generated in the housing sealed by the radiation window, wherein the window element is produced by a chemical vapor deposition process, wherein the radiation window is attached to the housing by sintering, soldering, welding and/or gluing, and wherein the protection film is disposed on the window element after the window element closes the opening of the housing such that the protection film extends to the housing and at least partially covers the housing.

19. A radiation window for a radiation detector or a radiation source, the radiation window comprising:

a window element;

a protection film; and a frame mechanically carrying the window element together with the protection film, wherein the protection film at least partially covers a first main surface of the window element facing away from the radiation detector or the radiation source, and wherein the protection film extends to the frame and completely surrounds the window element together with the frame on all sides.

* * * * *